United States Patent [19]

Yonekawa et al.

[11] Patent Number: 5,069,475
[45] Date of Patent: Dec. 3, 1991

[54] FLUID PRESSURE TYPE ACTIVE SUSPENSION HAVING VARIABLE PERFORMANCE RESPONSIVE TO FRONT TO REAR WHEEL STEERING ANGLE RATIO

[75] Inventors: Takashi Yonekawa, Mishima; Shuuichi Buma; Toshio Aburaya, both of Toyota; Kunihito Sato, Susono; Masaki Kawanishi, Toyota; Toshiaki Hamada, Toyota; Shinichi Tagawa, Toyota, all of Japan

[73] Assignees: Toyota Jidosha Kabushiki Kaisha; Aisin Seiki Kabushiki Kaisha, both of Aichi, Japan

[21] Appl. No.: 575,553

[22] Filed: Aug. 30, 1990

[30] Foreign Application Priority Data

Sep. 5, 1989 [JP] Japan ................... 1-230244

[51] Int. Cl.⁵ .............................. B60G 11/26
[52] U.S. Cl. ............................... 280/707; 280/91; 180/142
[58] Field of Search ............ 280/91, 707, 714; 180/142; 346/424.05

[56] References Cited

U.S. PATENT DOCUMENTS

| | | | |
|---|---|---|---|
| 4,717,173 | 1/1988 | Sugasawa et al. | 280/707 |
| 4,789,935 | 12/1988 | Buma et al. | 364/424.05 |
| 4,853,860 | 8/1989 | Achenbach | 364/424.05 |
| 4,973,080 | 11/1990 | Ikemoto et al. | 280/707 |
| 4,979,115 | 12/1990 | Takahashi | 364/424.05 |
| 4,999,777 | 12/1991 | Schussler et al. | 364/424.05 |

FOREIGN PATENT DOCUMENTS

| | | |
|---|---|---|
| 0114757 | 8/1984 | European Pat. Off. |
| 3408292A1 | 8/1985 | Fed. Rep. of Germany |
| 55-91458 | 7/1980 | Japan |
| 60-135368 | 7/1985 | Japan |
| 61-218414 | 9/1986 | Japan |
| 62-198509 | 9/1987 | Japan |
| 63-106133 | 5/1988 | Japan |
| 63-106127 | 6/1988 | Japan |
| 63-279915 | 11/1988 | Japan |
| 1-197109 | 8/1989 | Japan |
| 2-38122 | 2/1990 | Japan |
| 63 307190 | 6/1990 | Japan |
| 63 607189 | 6/1990 | Japan |

Primary Examiner—Kenneth R. Rice
Attorney, Agent, or Firm—Oliff & Berridge

[57] ABSTRACT

A fluid pressure type active suspension in a vehicle such as an automobile having a four wheel steering means, including a fluid pressure type actuator provided between the vehicle body and each wheel, working fluid supply and exhaust means for supplying and exhausting a working fluid to and from each actuator, vehicle height detection means for detecting vehicle height of a portion of the vehicle body corresponding to each wheel relative to the wheel, and a control means for controlling the working fluid supply and exhaust means according to control parameters including a vehicle height detected by the vehicle height detection means, wherein the control means is adapted to modify the control of the working fluid supply and exhaust means in accordance with whether a front to rear wheel steering angle ratio of the four wheel steering means is in a same phase region or an opposite phase region so that the vehicle height is controlled to be higher or lower or the rolling control is suppressed less or more according to whether the front to rear wheel steering angle ratio is in the opposite phase region or in the same phase region, respectively.

5 Claims, 23 Drawing Sheets

FIG. 6B

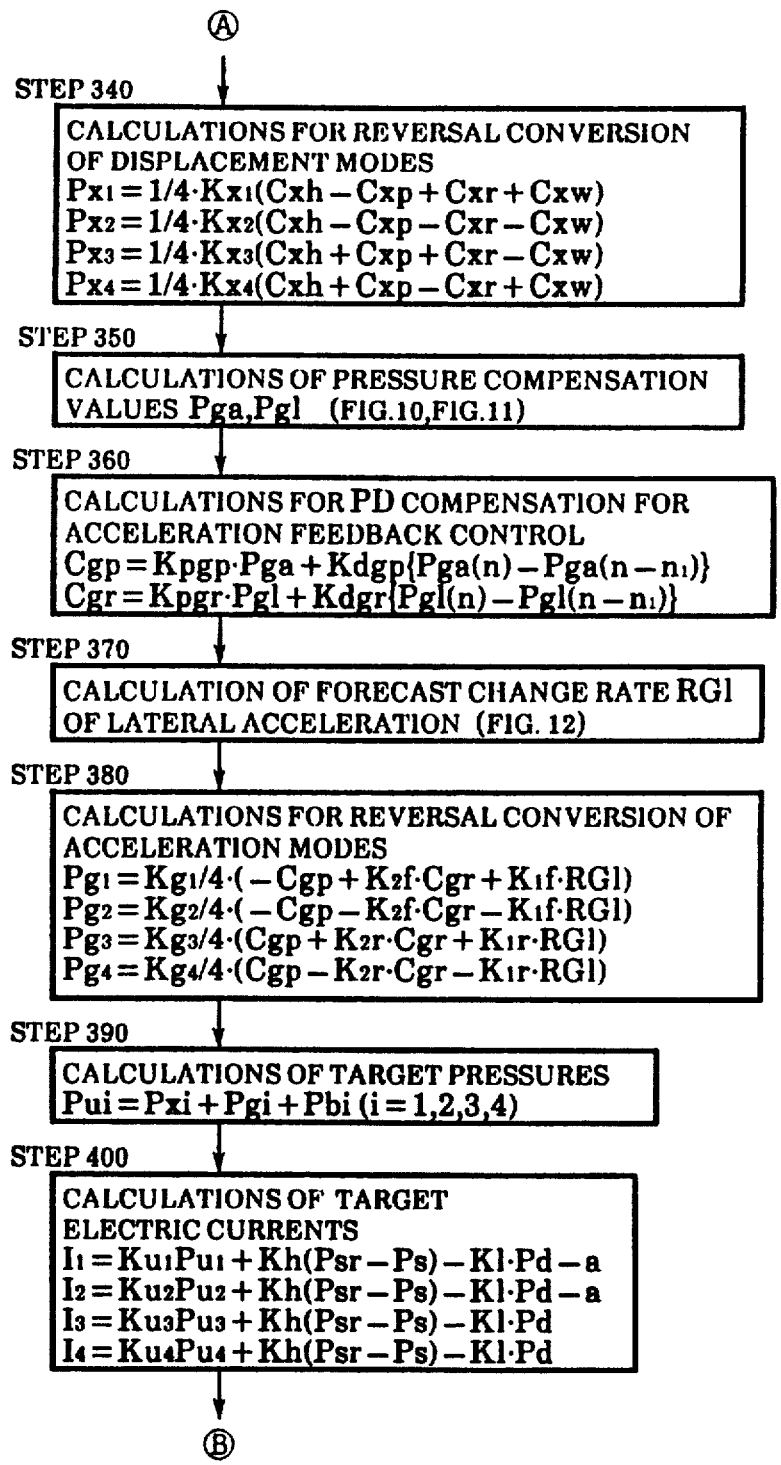

Ⓐ

STEP 340
CALCULATIONS FOR REVERSAL CONVERSION
OF DISPLACEMENT MODES
$Px_1 = 1/4 \cdot K_{x1}(Cxh - Cxp + Cxr + Cxw)$
$Px_2 = 1/4 \cdot K_{x2}(Cxh - Cxp - Cxr - Cxw)$
$Px_3 = 1/4 \cdot K_{x3}(Cxh + Cxp + Cxr - Cxw)$
$Px_4 = 1/4 \cdot K_{x4}(Cxh + Cxp - Cxr + Cxw)$ STEP 350
CALCULATIONS OF PRESSURE COMPENSATION
VALUES $Pga, Pgl$ (FIG.10, FIG.11)

STEP 360
CALCULATIONS FOR PD COMPENSATION FOR
ACCELERATION FEEDBACK CONTROL
$Cgp = Kpgp \cdot Pga + Kdgp\{Pga(n) - Pga(n - n_1)\}$
$Cgr = Kpgr \cdot Pgl + Kdgr\{Pgl(n) - Pgl(n - n_1)\}$ STEP 370
CALCULATION OF FORECAST CHANGE RATE $RGl$
OF LATERAL ACCELERATION (FIG. 12)

STEP 380
CALCULATIONS FOR REVERSAL CONVERSION OF
ACCELERATION MODES
$Pg_1 = Kg_1/4 \cdot (-Cgp + K_{2f} \cdot Cgr + K_{1f} \cdot RGl)$
$Pg_2 = Kg_2/4 \cdot (-Cgp - K_{2f} \cdot Cgr - K_{1f} \cdot RGl)$
$Pg_3 = Kg_3/4 \cdot (Cgp + K_{2r} \cdot Cgr + K_{1r} \cdot RGl)$
$Pg_4 = Kg_4/4 \cdot (Cgp - K_{2r} \cdot Cgr - K_{1r} \cdot RGl)$ STEP 390
CALCULATIONS OF TARGET PRESSURES
$Pu_i = Px_i + Pg_i + Pb_i$ (i = 1,2,3,4)

STEP 400
CALCULATIONS OF TARGET
ELECTRIC CURRENTS
$I_1 = Ku_1 Pu_1 + Kh(Psr - Ps) - Kl \cdot Pd - a$
$I_2 = Ku_2 Pu_2 + Kh(Psr - Ps) - Kl \cdot Pd - a$
$I_3 = Ku_3 Pu_3 + Kh(Psr - Ps) - Kl \cdot Pd$
$I_4 = Ku_4 Pu_4 + Kh(Psr - Ps) - Kl \cdot Pd$

Ⓑ

FLUID PRESSURE TYPE ACTIVE SUSPENSION HAVING VARIABLE PERFORMANCE RESPONSIVE TO FRONT TO REAR WHEEL STEERING ANGLE RATIO

BACKGROUND OF THE INVENTION

1. Field of the Invention

The present invention relates to an active suspension in a vehicle such as an automobile, and more particularly to a fluid pressure type active suspension in a vehicle having a four wheel steering means.

2. Description of the Prior Art

A four wheel steering means responsive to vehicle speed so as to change the steering angle according to the vehicle speed is known as shown in, for example, Japanese Patent Laying-open Publication 60-135368. A four wheel steering means responsive to the steering angle so as to change the front to rear wheel steering angle ratio is known as shown in, for example, Japanese Patent Laying-open Publication 55-91458. By employing such a four wheel steering means the turning performance of the vehicle with a small turning radius at low vehicle speed or the steering stability of the vehicle at medium to high vehicle speed is improved.

Further, as shown in, for example, Japanese Patent Laying-open Publication 63-279915, it is known to incorporate in a vehicle such as an automobile an active suspension which comprises fluid pressure type actuators, a fluid pressure type actuator being provided between a vehicle body and each wheel, working fluid supply and exhaust means for supplying and exhausting a working fluid to and from said actuators, and a control means for controlling said working fluid supply and exhaust means according to the steering state of the vehicle so as positively to suppress the rolling of the vehicle body.

As the rolling of the vehicle body is effectively suppressed by such a fluid pressure type active suspension, it is contemplated to use it in a vehicle having a four wheel steering means so as further to improve the steering stability of the vehicle.

However, since the responsiveness of the vehicle body to the lateral acceleration in the vehicle having the four wheel steering means changes according to change of the front to rear wheel steering angle ratio, when the working fluid supply and exhaust means is controlled only in accordance with the steering state of the vehicle, it sometimes happens that the roll control for the vehicle body is too much while it sometimes happens that the roll control for the vehicle body is not enough, thus making it difficult to carry out the roll control for the vehicle body constantly at a most desirable condition.

SUMMARY OF THE INVENTION

In view of the above-mentioned problems in the fluid pressure type active suspension in a vehicle having a four wheel steering means, it is the object of the present invention to provide an improved fluid pressure type active suspension which is capable of effectively and desirably suppressing the rolling of the vehicle body in accordance with the operating state of the four wheel steering means so that the roll control for the vehicle body is always desirably performed so as not to become excessive or insufficient.

According to the present invention, the above-mentioned object is accomplished by a fluid pressure type active suspension in a vehicle such as an automobile having a four wheel steering means, comprising fluid pressure type actuators, a fluid pressure type actuator being provided between a vehicle body and each wheel, working fluid supply and exhaust means for supplying and exhausting a working fluid to and from each said actuator, vehicle height detection means for detecting vehicle height of a portion of the vehicle body corresponding to each said wheel relative to said wheel, and a control means for controlling said working fluid supply and exhaust means according to control parameters including a vehicle height detected by said vehicle height detection means, wherein said control means is adapted to modify the control of said working fluid supply and exhaust means in accordance with whether a front to rear wheel steering angle ratio of said four wheel steering means is in a same phase region or an opposite phase region.

According to an embodiment of the present invention said control means may control said working fluid supply and exhaust means so as to adjust the vehicle height detected by said vehicle height detection means to a target value therefor, said target value being set in said control means to be lower when said front to rear wheel steering angle ratio is in said same phase region than when said front to rear wheel steering angle ratio is in said opposite phase region.

According to another embodiment of the present invention said control means may control said working fluid supply and exhaust means so as to suppress rolling of the vehicle body due to turning of the vehicle, said control means suppressing said rolling of the vehicle body more when said front to rear wheel steering angle ratio is in said same phase region than when said front to rear wheel steering angle ratio is in said opposite phase region. In this case, said control means may control said working fluid supply and exhaust means so as to suppress said rolling of the vehicle body due to turning of the vehicle based upon forecasting a change rate of a lateral acceleration generated in the vehicle body due to turning of the vehicle, said change rate of the lateral acceleration being forecast to be higher when said front to rear wheel steering angle ratio is in said same phase region than when said front to rear wheel steering angle ratio is in said opposite phase region.

In connection with the present invention, said four wheel steering means may be adapted to provide said front to rear wheel steering angle ratio in a variable manner in accordance with a selection of mode between a normal mode and a sports mode, said four wheel steering means providing said front to rear wheel steering angle ratio in said opposite phase at a vehicle speed lower than a first vehicle speed and in said same phase at a vehicle speed higher than said first vehicle speed according to said normal mode, while said four wheel steering means providing said front to rear wheel steering angle ratio in said opposite phase at vehicle speed lower than a second a vehicle speed which is higher than said first vehicle speed and in said same phase at vehicle speed higher than said second vehicle speed according to said sports mode.

BRIEF DESCRIPTION OF THE DRAWINGS

In the accompanying drawings,

FIGS. 6A through 6C are flowcharts showing the subroutine calculations for the active control carried out in step 110 in the flowchart shown in FIG. 3 according to a first embodiment of the present invention;

DESCRIPTION OF THE PREFERRED EMBODIMENTS

In the following the invention will be described with respect to some preferred embodiments with reference to the accompanying drawings.

Figure 1:
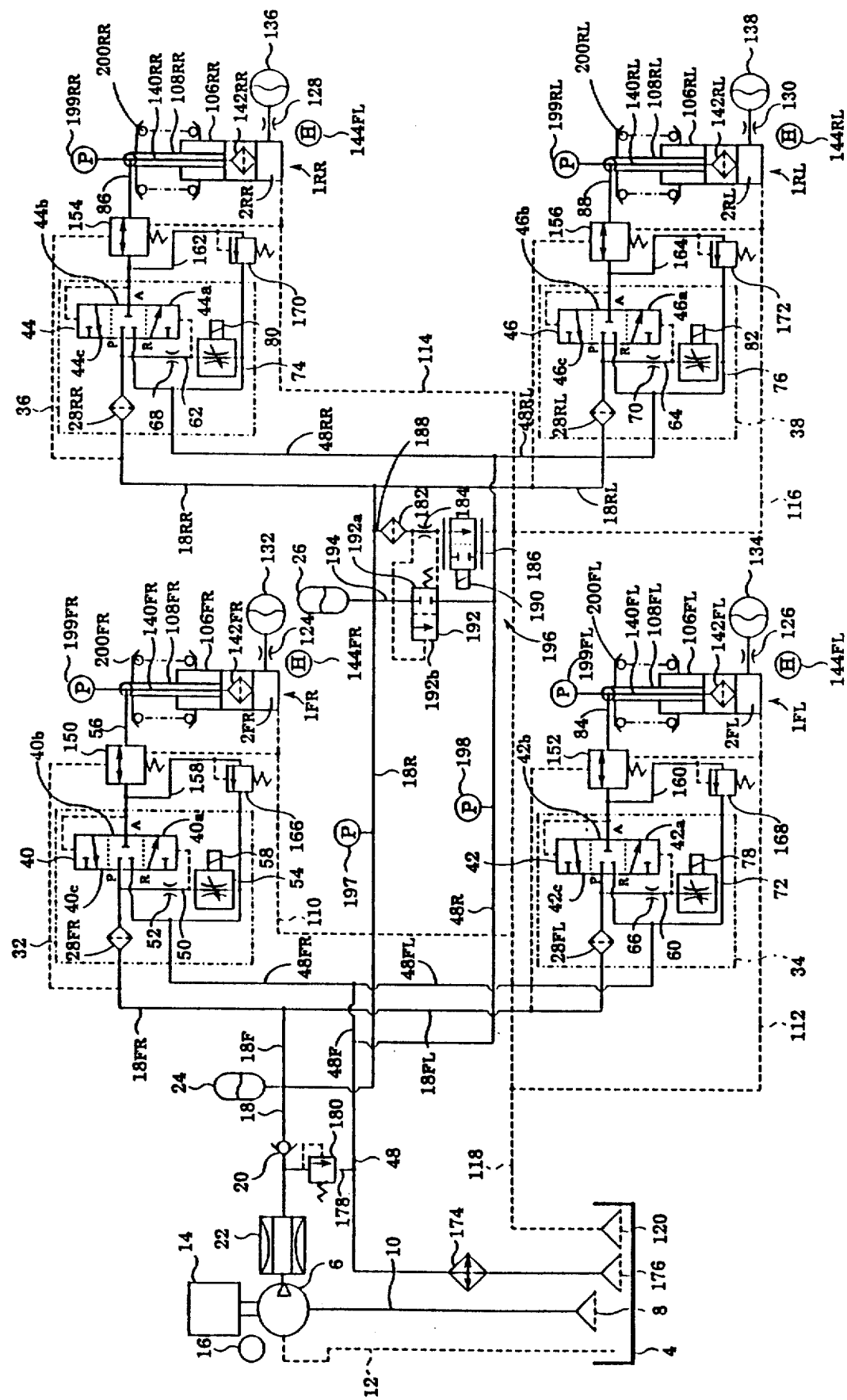
FIG. 1 is a diagrammatic illustration of the fluid pressure circuits of a fluid pressure type active suspension system in which the present invention is incorporated.

Referring to FIG. 1 showing diagrammatically the fluid circuits of the fluid pressure type active suspension system in which the present invention is incorporated, the suspension system herein shown includes actuators 1FR, 1FL, 1RR and 1RL provided for front right, front left, rear right and rear left vehicle wheels, not shown, respectively. These actuators have therein working fluid chambers 2FR, 2FL, 2RR, and 2RL, respectively.

In this figure, 4 designates a reserve tank which contains oil serving as the working fluid, and the tank 4 is connected to the suction side of a pump 6 by a suction line 10 having therein a filter 8 for removing foreign materials from the oil. The pump 6 is connected with a drain line 12 which collects the oil leaked in the pump and returns it to the reserve tank 4. The pump 6 is drivingly connected with and rotationally driven by an engine 14, the rotational speed of which is detected by a rotational speed sensor 16.

A high pressure line 18 is connected with the discharge side of the pump 6. A check valve 20 is incorporated in the high pressure line 18 so as to permit only the flow of oil in the direction from the pump toward the actuators, and an attenuator 22 is provided between the pump 6 and the check valve 20 so as to absorb or dampen the pressure pulsation of the oil discharged from the pump, thereby reducing the pressure variation. The high pressure line 18 is connected with one end each of a high pressure line 18F for the front vehicle wheels and a high pressure line 18R for the rear vehicle wheels, with which are connected accumulators 24 and 26, respectively. These accumulators contain therein pressurized gas and serve to absorb pressure variation of the oil and to accumulate pressure. A high pressure line 18FR for the front right vehicle wheel and a high pressure line 18FL for the front left vehicle wheel are each connected at one end thereof with the high pressure line 18F, while a high pressure line 18RR for the rear right vehicle wheel and a high pressure line 18RL for the rear left vehicle wheel are each connected at one end thereof with the high pressure line 18R. The high pressure lines 18FR, 18FL, 18RR and 18RL have filters 28FR, 28FL, 28RR and 28RL, respectively, and are connected at their other ends with ports P of pilot-operated three-port switching control valves 40, 42, 44 and 46 included in pressure control means 32, 34, 36 and 38, respectively.

The pressure control means 32 comprises the switching control valve 40, a line 50 for connecting the high pressure line 18FR with a low pressure line 48FR for the front right vehicle wheel, a fixed throttle means 52 and a variable throttle means 54 both provided in the line 50. The switching control valve 40 has, in addition to the port P, ports R and A connected with a low pressure line 48FR and a connection line 56, respectively. The switching control valve 40 may be a spool type valve adapted to be switched over by a pilot pressure Pp taken from the line 50 at a portion between the throttle means 52 and 54 and a pressure Pa taken from the connection line 56 to a switching position 40a where it communicates the port P with the port A when the pressure Pp is substantially higher than the pressure Pa; a switching position 40b where it interrupts communication among all the ports when the pressure Pp is substantially equal to Pa; and a shifting position 40c where it communicates the port R with the port A when the pressure Pp substantially lower than the pressure Pa. The variable throttle means 54 is adapted to vary its effective flow area by the electric current supplied to its solenoid 58 being controlled and to cooperate with the fixed throttle means 52 to variably control the pilot pressure Pp.

Similarly, the pressure control means 34, 36 and 38 comprise pilot-operated, three-port switching control valves 42, 44 and 46 corresponding to the valve 40, lines 60, 62 and 64 corresponding to the line 50, fixed throttle means 66, 68 and 70 corresponding to the throttle means 52, and variable throttle means 72, 74 and 76 corresponding to the variable throttle means 54, respectively. The variable throttle means 72, 74 and 76 have solenoids 78, 80 and 82, respectively, corresponding to the solenoid 58.

The switching control valves 42, 44 and 46 have the same construction as the switching valve 40, and have the ports R connected with one end of a low pressure line 48FL for the front left vehicle wheel, a low pressure line 48RR for the rear right vehicle wheel, and a low pressure line 48RL for the rear left vehicle wheel, respectively, and the ports A connected with one end of connection lines 84, 86 and 88, respectively. The switching control valves 42, 44 and 46 are spool type valves adapted to take in as pilot pressures therefor the pressures Pp in the associated lines 60, 62 and 64 between the associated fixed and the variable throttling means and the pressures Pa in the associated lines 84, 86 and 88, and to be shifted to switching positions 42a, 44a and 46a, respectively, where they communicate the ports P with the ports A when the pressures Pp are substantially higher than the pressures Pa; shifting positions 42b, 44b and 46b where they interrupt communications among all the ports when the pressures Pp are substantially equal to the pressures Pa; and shifting positions 42c, 44c and 46c where they communicate the ports R with the ports A when the pressures Pp are substantially lower than the pressures Pa.

As shown schematically in FIG. 1, the actuators 1FR, 1FL, 1RR and 1RL include cylinders 106FR, 106FL, 106RR and 106RL and pistons 108FR, 108FL, 108RR and 108RL reciprocatalily inserted in the associated cylinders, defining working fluid chambers 2FR, 2FL, 2RR and 2RL, respectively. While in the shown embodiment the actuators are located between a vehicle body (not shown) and associated suspension arms (also not shown) with each cylinder being coupled to the associated suspension arm and the upper end of the rod portion of each piston being coupled to the vehicle body, each cylinder may be coupled to the vehicle body while each piston may be coupled to the associated suspension arm. Drain lines 110, 112, 114 and 116 are connected at one end with the cylinders 106FR, 106FL, 106RR and 106RL of the actuators, respectively. The other ends of the drain lines 110, 112, 114 and 116 are connected with a drain line 118 which in turn is connected with the reserve tank 4 by way of a filter 120 so that the oil leaked from the working fluid chambers may be returned to the tank.

Accumulators 132, 134, 136 and 138 are connected to the working fluid chambers 2FR, 2FL, 2RR and 2RL by way of throttle means 124, 126, 128 and 130, respectively, serving as hydropneumatic springs. The pistons 108FR, 108FL, 108RR and 108RL have therein passages 140FR, 140FL, 140RR and 140RL, respectively. These passages connect the associated lines 56, 84, 86 and 88 with the associated working fluid chambers 2FR, 2FL, 2RR and 2RL, respectively, and have therein filters 142FR, 142FL, 142RR and 142RL, respectively. Adjacent the actuators 1FR, 1FL, 1RR and 1RL there are installed vehicle height sensors 144FR, 144FL, 144RR and 144RL, respectively, for detecting vehicle heights corresponding to the associated vehicle wheels.

The lines 56, 84, 86 and 88 have therein pilot-operated cut-off valves 150, 152, 154 and 156, respectively, which are in closed conditions whenever the pressure differences between the pressures in the high pressure lines 18FR, 18FL, 18RR and 18RL upstream of the associated pressure control valves 40, 42, 44 and 46, respectively, and the pressures in the drain lines 110, 112, 114 and 116, respectively, are not more than respective predetermined values. The lines 56, 84, 86 and 88 are, at portions thereof between the associated pressure control valves and the cut-off valves, connected with the line 50, 60, 62 and 64 on the downstream side of the associated variable throttle means by lines 158, 160, 162 and 164, respectively, which have therein relief valves 166, 168, 170 and 172, respectively, adapted to take in as pilot pressures therefor the pressures in the associated lines 158, 160, 162 and 164, respectively, on the upstream side thereof, and to open when the pilot pressures exceed respective predetermined values so as thereby to conduct certain amount of oil in the connection lines to the lines 50, 60, 62 and 64, respectively.

The cut-off valves 150, 152, 154 and 156 may be adapted to remain closed whenever the differences between the pressures in the high pressure lines 18FR, 18FL, 18RR and 18RL and the atmospheric pressure are not more than respective predetermined values.

The lines 48FR and 48FL are connected at their other ends with one end of a low pressure line 48F for the front vehicle wheels, while the lines 48RR and 48RL are connected at their other ends with one end of a low pressure line 48R for the rear vehicle wheels. The lines 48F and 48R are connected at their other ends with one end of a low pressure line 48. The line 48 has therein an oil cooler 174 and is connected at the other end with the reserve tank 4 by way of a filter 176. The high pressure line 18 is connected, at a portion between the check valve 20 and the attenuator 22, with the low pressure line 48 by a line 178. The line 178 has therein a relief valve 180 adapted to open when its pilot pressure is higher than a predetermined value.

The high pressure line 18R and the low pressure line 48R are connected with each other by a line 188 which has therein a filter 182, a throttle means 184 and a normally open type electromagnetic on-off valve 186 including a solenoid 190 for controlling the valve opening. The on-off valve 186 that opens when its solenoid 190 is energized and controls the flow rate of the oil flowing therethrough according to control of the energizing electric current supplied thereto. The high pressure line 18R and the low pressure line 48R are further connected with each other by a line 194 having therein a pilot-operated on-off valve 192. The on-off valve 192 is adapted to take in as a pilot pressure therefor the pressures on opposite sides of the throttle means 184 and to remain in its closed position 192a when no substantial pressure difference exists between the pressures on opposites sides of the throttle means 184 and to be switched over to its open position 192b when the pressure difference across the throttle means 184 is higher than a predetermined value. Thus, the throttle means 184, the electromagnetic on-off valve 186 and the on-off valve 192 cooperate with each other to define a bypass means 196 which selectively communicates the high pressure line 18R with the low pressure line 48R while controlling the flow rate of the oil flowing from the high pressure line to the low pressure line.

Further in the shown embodiment, a pressure sensor 197 is connected to the high pressure line 18R for detecting the oil pressure Ps therein and similarly a pressure sensor 198 is connected to the low pressure line 48R for detecting the oil pressure Pd therein. Pressure sensors 199FR, 199RL. 199RR and 199RL are connected to the connection lines 56, 84, 86 and 88 for detecting the oil pressure in the working fluid chambers 2FR, 2FL, 2RR and 2RL, respectively. A temperature sensor 195 is provided in the reserve tank 4 for detecting the temperature T of the oil in the tank.

Compression coil springs 200FR, 200FL, 200RR and 200RL serving as suspension springs are interposed between the upper seats attached to the rod portions of the pistons 108FR, 108FL, 108RR and 108RL incorporated in the actuators and the lower seats secured to the cylinders 106FR, 106FL, 106RR and 106RL, respectively.

Figure 7:
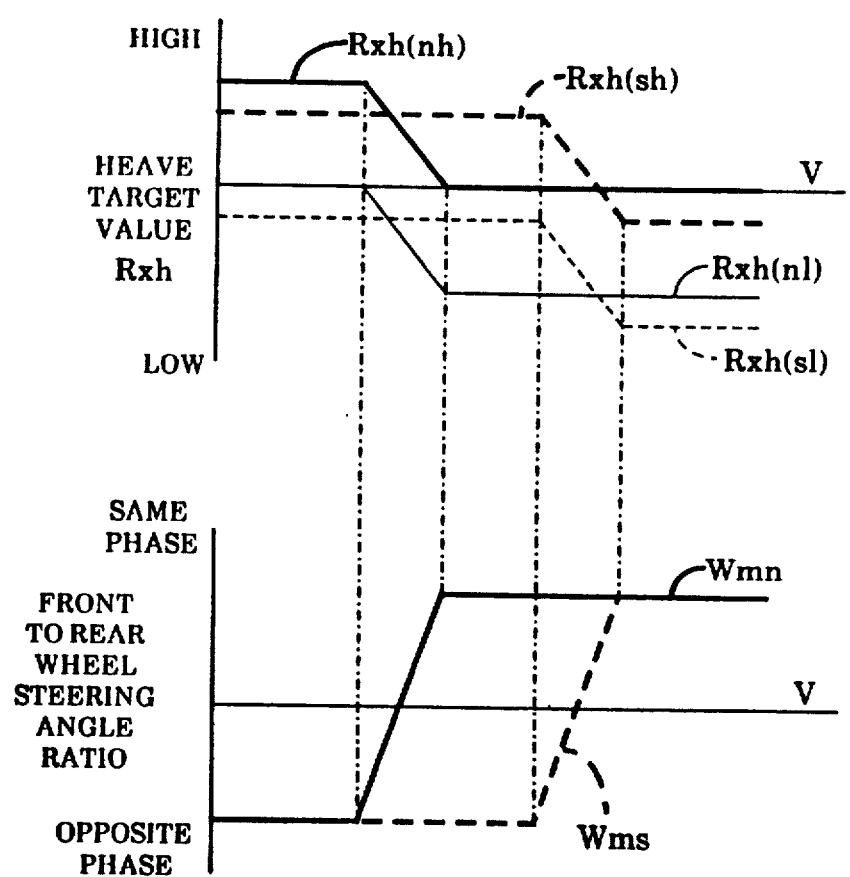
FIG. 7 is a graph showing a relation between the vehicle speed V and the target displacement Rxh together with the performance curves of the four wheel steering means.

In the vehicle in which the above-mentioned active suspension is incorporated there is also incorporated a four wheel steering means which changes a ratio of the front wheel steering angle to the rear wheel steering angle, i.e. the front to rear wheel steering angle ratio, according to the vehicle speed, as shown in the lower half portion of FIG. 7, with availability of switching over by an operation of a changeover switch provided in the cabin of its performance between a normal mode Wmn which changes over the relation between the front wheel steering angle and the rear wheel steering angle from an opposite phase relation to a same phase relation at and above a relatively low vehicle speed and a sports mode Wms which changes over the relation between the front wheel steering angle and the rear wheel steering angle from the opposite phase relation to the same phase relation at and above a relatively high vehicle speed.

Figure 2:
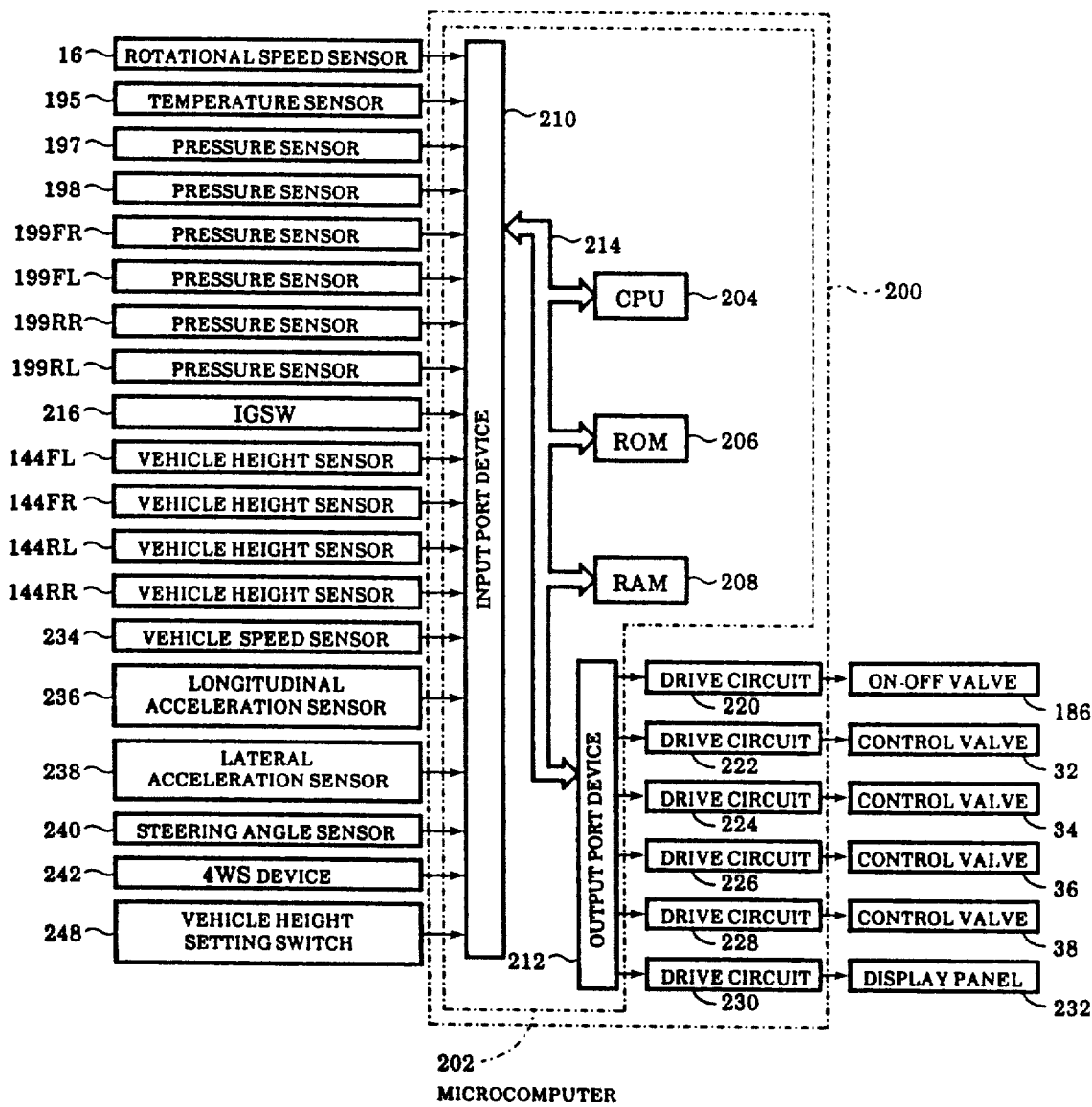
FIG. 2 is a block diagram showing an electric control device for controlling the active suspension system shown in FIG. 1.

The electromagnetic on-off valve 186 and the pressure control means 32, 34, 36 and 38 are controlled by an electric control device 200 shown in FIG. 2. The electric control device 200 includes a microcomputer 202. The microcomputer 202 may, as shown in FIG. 2, be of a conventional construction having a central processing unit (CPU) 204, a read only memory (ROM) 206, a random access memory (RAM) 208, an input port device 210, and an output port device 212, all of these being interconnected with each other by a two way common bus 214.

The input port device 210 is supplied with a signal indicative of the rotational speed N of the engine 14 from the rotational speed sensor 16, a signal indicative of the temperature T of the oil from the temperature sensor 195, signals indicative of the pressures Ps and Pd within the high pressure and the low pressure lines from the pressure sensors 197 and 198, respectively, signals indicative of the pressures Pi (i=1, 2, 3 and 4) in the working fluid chambers 2FL, 2FR, 2RL and 2RR from the pressure sensors 199FL, 199FR, 199RL and 199RR, respectively, a signal indicative of whether or not an ignition switch (IGSW) 216 is on from the ignition switch, and signals indicative of the vehicle heights Xi (i=1, 2, 3 and 4) corresponding to the front left wheel, the front right wheel, the rear left wheel, and the rear right wheel from the vehicle height sensors 144FL, 144FR, 144RL and 144RR, respectively.

Further, the input port device 210 is supplied with a signal indicative of a vehicle speed V from a vehicle speed sensor 234, a signal indicative of a longitudinal acceleration Ga from a longitudinal acceleration sensor 236, a signal indicative of a lateral acceleration G1 from a lateral acceleration sensor 238, a signal indicative of a steering angle theta from a steering angle sensor 240, a signal indicative of whether the four wheel steering mode set at the control means of the four wheel steering means 242 is the normal mode Wmn or the sports mode Wms, and a signal indicative of whether the mode Hset for controlling the vehicle height set by a vehicle height setting switch 248 is a high mode Hh or a normal mode Hn. The switch 248 is provided in the cabin to be operated by a driver or a passenger according to his taste.

The input port device 210 processes the signals input thereto in a predetermined manner, and under the control of the CPU 204 which is based upon the program stored in the ROM 206, outputs the processed signals to the CPU and the RAM 208. The ROM 206 stores the control flows shown in FIG. 3 and FIGS. 6A through 6C and the maps shown in FIGS. 4 and 5 and FIGS. 7 through 20. The output port device 212 outputs, under the control of the CPU 204, a control signal via drive circuit 220 to the electromagnetic on-off valve 186, control signals via drive circuits 222, 224, 226 and 228 to the pressure control means 32, 34, 36 and 38, or more exactly, to the solenoids 58, 78, 80 and 82 in the variable throttle means 54, 72, 74 and 76, respectively, and a control signal via a drive circuit 230 to a display panel 232.

Referring to the flowchart shown in FIG. 3, the general operation of the active suspension shown in FIG. 1 will be described.

Figure 3:
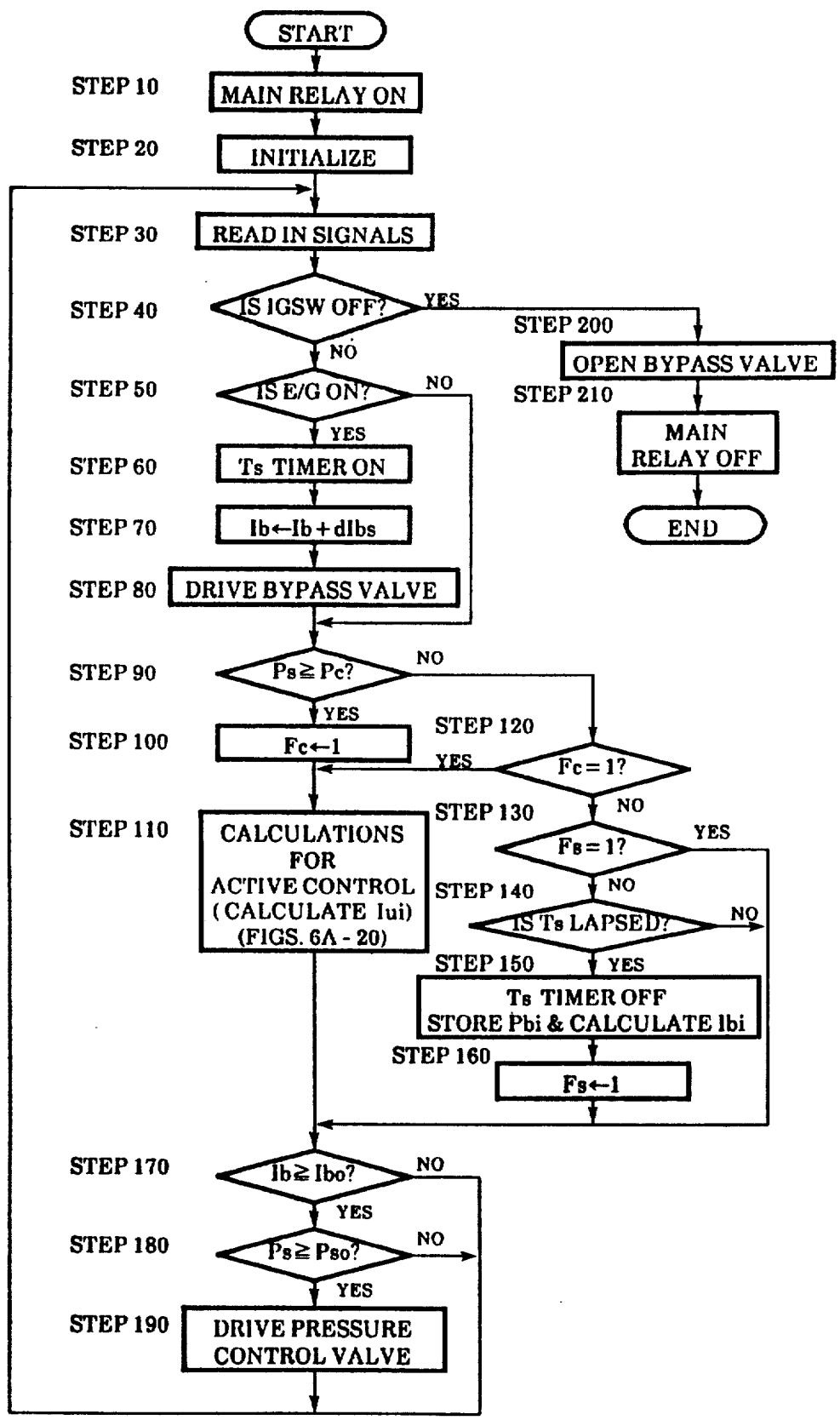
FIG. 3 is a flowchart showing a flow of control carried out by the electric control device shown in FIG. 2.

In this connection, it is to be noted that the routine of the control flow shown in FIG. 3 is initiated when the ignition switch 216 is turned on. It should also be noted that in the flowchart shown in FIG. 3, a flag Fc relates to whether or not the pressure Ps of the oil in the high pressure line has ever exceeded a threshold pressure Pc above which the cut-off valves 152, 150, 156 and 154 are completely opened and that Fc=1 means that the pressure Ps has at one time exceeded the pressure Pc, and a flag Fs relates to whether or not standby pressures Pbi (i=1, 2, 3 and 4) referred to later have been set for the pressure control valves 34, 32, 38 and 36, and that Fs=1 means that the standby pressures have been set.

In the first step 10, a main relay, not shown in the figures, is turned on, and then the flow of control proceeds to step 20.

In step 20, the RAM 208 is cleared of all the information stored therein and all the flags are reset to zero, and then the flow of control proceeds to step 30.

In step 30, data are read in with respect to the signal indicative of the rotational speed N of the engine 14 detected by the rotational speed sensor 16, the signal indicative of the temperature T of oil detected by the temperature sensor 195, the signals indicative of the pressures Ps and Pd in the high pressure and the low pressure line detected by the pressure sensors 197 and 198, respectively, the signals indicative of the pressures Pi in the working fluid chambers 2FL, 2FR, 2RL and 2RR detected by the pressure sensors 199FL, 199FR, 199RL and 199RR, the signal indicative of whether or not the ignition switch 216 is on, the signals indicative of the vehicle heights Xi detected by the vehicle height sensors 144FL, 144FR, 144RL and 144RR, the signal indicative of the vehicle speed V detected by the speed sensor 234, the signal indicative of the longitudinal acceleration Ga detected by the longitudinal acceleration sensor 236, the signal indicative of the lateral acceleration Gl detected by the lateral acceleration sensor 238, the signal indicative of the steering angle As detected by the steering angle sensor 240, the signal indicative of whether the steering mode set at the control means for the four wheel steering means is the normal mode Wmn or the sports mode Wms, and the signal indicative of whether the mode of controlling the vehicle height set by the vehicle height setting switch 248 is the high mode or the normal mode, and then the flow of control proceeds to step 40.

In step 40, it is judged whether or not the ignition switch is off. When it is judged that the ignition switch is off, the flow of control proceeds to step 200, whereas when it is judged that the ignition switch is not off, the flow of control proceeds to step 50.

In step 50, it is judged whether or not the engine is running according to whether or not the rotational speed N of the engine detected by the rotational speed sensor 16 and read in in step 30 is higher than a predetermined value. When it is judged that the engine is not running, the flow of control proceeds to step 90, whereas when it is judged that the engine is running, the flow of control proceeds to step 60.

It is to be understood that the judgement with regard to whether or not the engine is running may be made based upon other parameters such as, for example, whether or not the voltage of the electricity generated by an alternator, not shown, driven by the engine is higher than a predetermined value.

In step 60, a timer is started to count the period of time Ts from the time point at which the engine is started to the time point at which the standby pressures Pbi are set for the pressure control means 34, 32, 38 and 36 in step 150 referred to later, and then the flow of control proceeds to step 70. If, however, the timer has already been started, it continues time counting.

Figure 4:
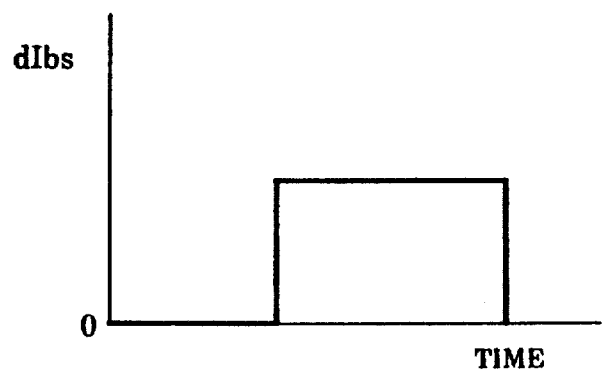
FIG. 4 is a graph showing a map used in calculating the electric current Ib to be supplied to the bypass control means when the active suspension system is being started.

In step 70, an electric current Ib to be supplied to the solenoid 190 in the electromagnetic on-off valve 186 in the bypass control means 196 is calculated according to a map such as the graph shown in FIG. 4 and the following equation and is stored in ROM 206:

$$Ib = Ib + dIbs$$

Then the flow of control proceeds to step 80. In step 80, the electric current Ib calculated in the step 70 is supplied to the solenoid 190 in the electromagnetic on-off valve 186 so as thereby to shift the bypass control means 196 to its fully closed state, and then the flow of control proceeds to step 90.

In step 90, it is judged whether or not the pressure Ps in the high pressure line is equal to or higher than the threshold value Pc. When it is judged that Ps is not equal to or not higher than Pc, the flow of control proceeds to step 120, whereas when it is judged that Ps is equal to or higher than Pc, the flow of control proceeds to step 100.

In step 100, the flag Fc is set to "1", and then the flow of control proceeds to step 110.

In step 110, as will be described in detail later with reference to FIGS. 6A through 6C and FIGS. 7 through 13, in order to control the comfortability of the vehicle and the posture of the vehicle body, calculations for the active control are carried out based upon the data read in in step 30 so as to calculate the electric currents Iui to be supplied to the solenoids 78, 58, 82 and 80 incorporated in the variable throttle means 72, 54, 76 and 74 in the pressure control means, and then the flow of control proceeds to step 170.

In step 120, it is judged whether or not the flag Fc is "1". When it is judged that the flag Fc is "1", i.e., the pressure Ps of the oil in the high pressure line has lowered to a level lower than the threshold pressure Pc after it had once been increased to a level equal to or higher than the threshold value, the flow of control proceeds to step 110, whereas when it is judged that the flag Fc is not "1", i.e., the pressure Ps has not yet been increased to a level equal to or higher than the threshold pressure Pc, then the flow of control proceeds to step 130.

In step 130, it is judged whether or not the flag Fs is "1". When it is judged that the flag Fs is "1", the flow of control proceeds to step 170, whereas when it is judged that the flag Fs is not "1", the flow of control proceeds to step 140.

In step 140, it is judged whether or not the time Ts has elapsed. When it is judged that the time Ts has not yet elasped, the flow of control proceeds to step 170, whereas when it is judged that the time Ts has elapsed, the flow of control proceeds to step 150.

Figure 5:
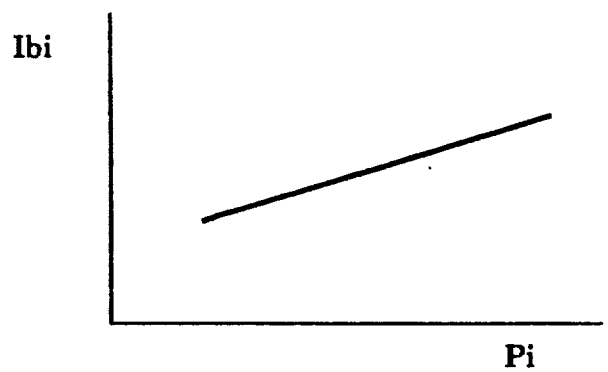
FIG. 5 is a graph showing a relation between the pressure Pi in the working fluid chambers of the actuators and the electric currents Ibi supplied to the pressure control means.

In step 150, the Ts timer is stopped, and the pressures Pi read in in step 30 are stored in the RAM 208 as the standby pressures Pbi, and further the values of the electric currents Ibi (i=1, 2, 3 and 4) to be supplied to the solenoids 78, 58, 82 and 80 incorporated in the variable throttle means 72, 54, 76 and 74 in the pressure control means 34, 32, 38 and 36 are calculated based upon the map as shown in FIG. 5 stored in the ROM 206 so that the pressures in the connection lines 84, 56, 88 and 86 between the associated pressure control means and the associated cut-off valves are controlled to the respective standby pressures Pbi, i.e., the pressures which are substantially equal to the pressures Pi in the working fluid chambers 2FL, 2FR, 2RL and 2RR that are detected by the associated pressure sensors, and then the flow of control proceeds to step 160.

In step 160, the flag Fs is set to "1", and then the flow of control proceeds to step 170.

In step 170, it is judged whether or not the electric current Ib calculated in step 70 is not less than a reference value Ibo. When it is judged that the current Ib is less than Ibo, the flow of control is returned to step 30, whereas when it is judged that the current Ib is not less than Ibo, the flow of control proceeds to step 180.

In step 180, it is judged whether or not the pressure Ps in the high pressure line read in in step 30 is not less than a reference value Pso which is lower than the threshold value Pc. When it is judged that Ps is less than Pso, then the flow of control is returned to step 30, whereas when it is judged that Ps is not less than Pso, the flow of control proceeds to step 190.

In step 190, the electric currents Ibi calculated in step 150 or the electric currents Iui calculated in step 110 are supplied to the solenoids 78, 58, 82 and 80 incorporated in the variable throttle means included in the associated pressure control means so that they are operated to adjust the pressures in the working fluid chambers in the associated actuators, and then the flow of control is returned to step 30. Thus, the steps 30 through 190 are repeated.

In step 200, the supply of the electric current to the solenoid 190 in the electromagnetic on-off valve 186 is stopped to open the bypass control means 196, and then the flow of control proceeds to step 210.

In step 210, the main relay is turned off to finish the control flow shown in FIG. 3, and the supply of electricity to the electric control device 200 shown in FIG. 2 is stopped.

It is to be noted that the pressure control conducted by the bypass control means when the system is started forms no essential part of the present invention. For more details in this regard, if desired, reference should be made to Japanese Patent Application 63-307189 assigned to the assignee as the present application. It is also to be understood that the pressure control conducted by the bypass control means for stopping the system may be carried out in the same manner as in the system described in Japanese Patent Application 63-307190 assigned to the same assignee as the present application.

Referring next to the FIGS. 6A through 6C and FIGS. 7 through 13, the calculations for the active control carried out in the above-mentioned step 110 according to a first embodiment of the present invention will be described.

In step 250, it is judged whether or not the four wheel steering mode Wm is the sports mode Wms. When it is judged that Wm is not Wms, the flow of control proceeds to step 258, whereas when it is judged that Wm is Wms, the flow of control proceeds to step 252.

In step 252, it is judged whether or not the vehicle height control mode Hm is the high mode Hmh, and when it is judged that Hm is not Hmh, the flow of control proceeds to step 256, whereas when it is judged that Hm is Hmh, the flow of control proceeds to step 254.

In step 254, the heave target value Rxh is calculated to be Rxh(sh) according to a map such as shown by a bold broken line in the graph of the upper half portion of FIG. 7, and then the flow of control proceeds to step 264.

In step 256, the heave target value Rxh is calculated to be Rxh(sl) according to a map such as shown by a thin broken line in the graph of the upper half portion of FIG. 7, and then the flow of control proceeds to step 264.

In step 258, it is judged whether or not the vehicle height control mode Hm is the high mode Hmh, and when it is judged that Hm is not Hmh, the flow of control proceeds to step 262, whereas when it is judged that Hm is Hmh, the flow of control proceeds to step 260.

In step 260, the heave target value Rxh is calculated to be Rxh(nh) according to a map such as shown by the bold solid line in the graph of the upper half portion of FIG. 7, and then the flow of control proceeds to step 264.

In step 262, the heave target value Rxh is calculated to be Rxh(nl) according to a map such as shown by the thin solid line in the graph of the upper portion of FIG. 7, and then the flow of control proceeds to step 264.

In the embodiment shown in FIG. 7, the heave target value Rxh(nh) for the normal and high vehicle height mode is a relatively high constant value in a region of relatively low vehicle speed corresponding to the opposite phase region of the front to rear wheel steering angle ratio according to the normal mode, and decreases to a lower constant value in a region of medium to high vehicle speed corresponding to the same phase region of the front to rear wheel steering angle ratio according to the normal mode. The heave target value Rxh(nl) for the normal and low vehicle height mode is generally less than Rxh(nh) by substantially the same amount at all vehicle speeds. The heave target value Rxh(sh) for the sports and high vehicle height mode is a relatively low constant value in a region of low to medium vehicle speed corresponding to the opposite phase region of the front to rear wheel steering angle ratio according to the sports mode, and decreases to a further lower constant value in a region of relatively high vehicle speed corresponding to the same phase region of the front to rear wheel steering angle ratio according to the sports mode. The heave target value Rxh(sl) for the sports and low vehicle height mode is generally less than Rxh(sh) by substantially the same amount at all vehicle speeds.

Figure 8:
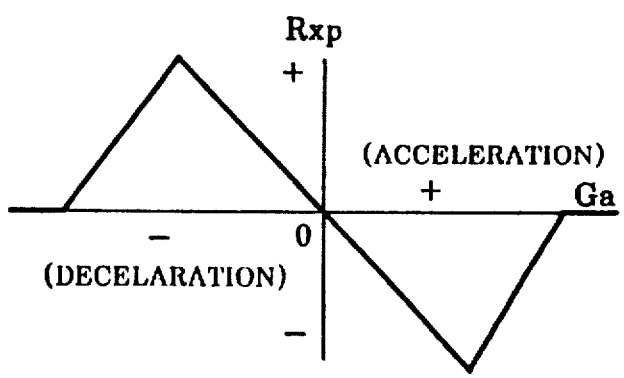
FIG. 8 is a graph showing a relation between the longitudinal acceleration Ga and the target displacement Rxp.
Figure 9:
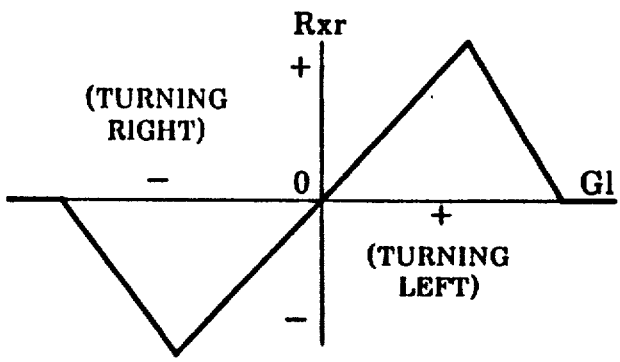
FIG. 9 is a graph showing a relation between the lateral acceleration Gl and the target displacement Rxr.

In step 264, based upon maps such as the graphs shown in FIGS. 8 and 9, target values Rxp and Rxr for the pitch and the roll, respectively, required for attaining a desired posture of the vehicle body are calculated, and then the flow of control proceeds to step 310.

In step 310, based upon the vehicle heights X1, X2, X3 and X4 at the front left, front right, rear left, and rear right wheels read in in step 30, calculations for converting the displacements into values of heave "Xxh", pitch "Xxp", roll "Xxr" and warp "Xxw" are carried out according to the following equations, and thereafter the flow of control proceeds to step 320:

$$Xxh = (X1 + X2) + (X3 + X4)$$

$$Xxp = -(X1 + X2) + (X3 + X4)$$

$$Xxr = (X1 - X2) + (X3 - X4)$$

$$Xxw = (X1 - X2) - (X3 - X4)$$

In step 320, differences in the respective mode values are calculated according to the following equations, and then the flow of control proceeds to step 330:

$$Exh = Rxh - Xxh$$

$$Exp = Rxp - Xxp$$

$$Exr = Rxr - Xxr$$

$$Exw = Rxw - Xxw$$

In this connection, Rxw may be zero, or a value of Xxw calculated in step 310 just after the active suspension system has been started up to operate or an average value of Xxw calculated in the last few cycles. If the absolute value of Exw is equal to or less than W1 (a certain positive constant), Exw is set to zero.

In step 330, calculations for PID compensations in a displacement feedback control are carried out according to the following equations, and thereafter the flow of control proceeds to step 340.

$$Cxh = Kpxh \cdot Exh + Kixh \cdot Ixh(n) + Kdxh \cdot \{Exh(n) - Exh(n-nl)\}$$

$$Cxp = Kpxp \cdot Exp + Kixp \cdot Ixp(n) + Kdxp \cdot \{Exp(n) - Exp(n-nl)\}$$

$$Cxr = Kpxr \cdot Exr + Kixr \cdot Ixr(n) + Kdxr \cdot \{Exr(n) - Exr(n-nl)\}$$

$$Cxw = Kpxw \cdot Exw + Kixw \cdot Ixw(n) + Kdxw \cdot \{Exw(n) - Exw(n-nl)\}$$

In the above equations, $Ej(n)$ ($j = xh$, xp, xr, xw) are the current values of $Ej$, and $Ej(n-nl)$ are the values of $Ej$ at the cycle preceding the current cycle by $nl$ cycles. Further, denoting $Ij(n)$ and $Ij(n-1)$ to be the current value of $Ij$ and the value of $Ij$ at the cycle preceding the current cycle by one cycle, and Tx to be a time constant, respectively, $$Ij(n) = Ej(n) + Tx \cdot Ij(n-1)$$

Setting up Ijmax to be a predetermined value, the absolute value of $Ij$ is equal to or smaller than Ijmax. The coefficients Kpj, Kij and Kdj ($j = xh$, xp, xr and xw) are proportional constants, integration constants and differentiation constants, respectively.

In step 340, calculations for reversal conversion of the displacement modes are carried out according to the following equations, and then the flow of control proceeds to step 350:

$$Px1 = \tfrac{1}{4} \cdot Kx1(Cxh - Cxp + Cxr + Cxw)$$

$$Px2 = \tfrac{1}{4} \cdot Kx2(Cxh - Cxp - Cxr - Cxw)$$

$$Px3 = \tfrac{1}{4} \cdot Kx3(Cxh + Cxp + Cxr - Cxw)$$

$$Px4 = \tfrac{1}{4} \cdot Kx4(Cxh + Cxp - Cxr + Cxw)$$

wherein Kx1, Kx2, Kx3 and Kx4 are proportional constants.

Figure 10:
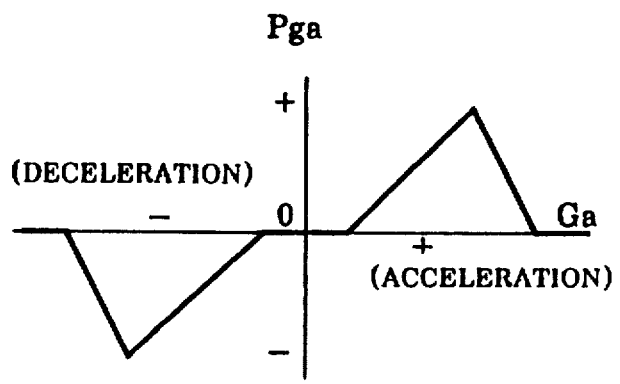
FIG. 10 is a graph showing a relation between the longitudinal acceleration Ga and the pressure compensation amount Pga.
Figure 11:
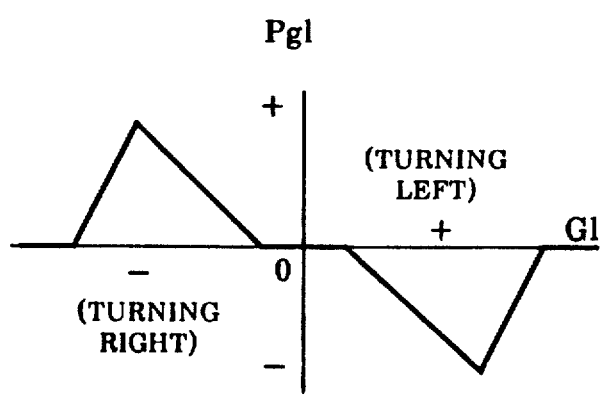
FIG. 11 is a graph showing a relation between the lateral acceleration Gl and the compensation amount Pgl for the pressure.

In step 350, based upon maps such as the graphs shown in FIGS. 10 and 11, pressure compensations Pga and Pgl in the longitudinal and lateral directions, respectively, are calculated, and then the flow of control proceeds to step 360:

In step 360, calculations for PD compensations for acceleration feedback control are carried out with respect to pitch (Cgp) and roll (Cgr) according to the following equations, and thereafter the flow of control proceeds to step 370:

$$Cgp = Kpgp \cdot Pga + Kdgp \cdot \{Pga(n) - Pga(n - nl)\}$$

$$Cgr = Kpgr \cdot Pgl + Kdgr \cdot \{Pgl(n) - Pgl(n - nl)\}$$

In the above equations Pga(n) and Pgl(n) are the current values of Pga and Pgl, respectively, and Pga(n−nl) and Pgl(n−nl) are the values of Pga and Pgl at the cycle preceding the current cycle by $n_1$ cycles, respectively. Kpgp and Kpgr are proportional constants, and Kdgp and Kdgr are differentiation constants.

In step 370, denoting the steering angle read in in step 30 at the cycle preceding the current by one cycle in the flowchart of FIG. 3 as As', steering angle velocity RAs is calculated according to the following equation:

$$RAs = As - As'$$

Figure 12:
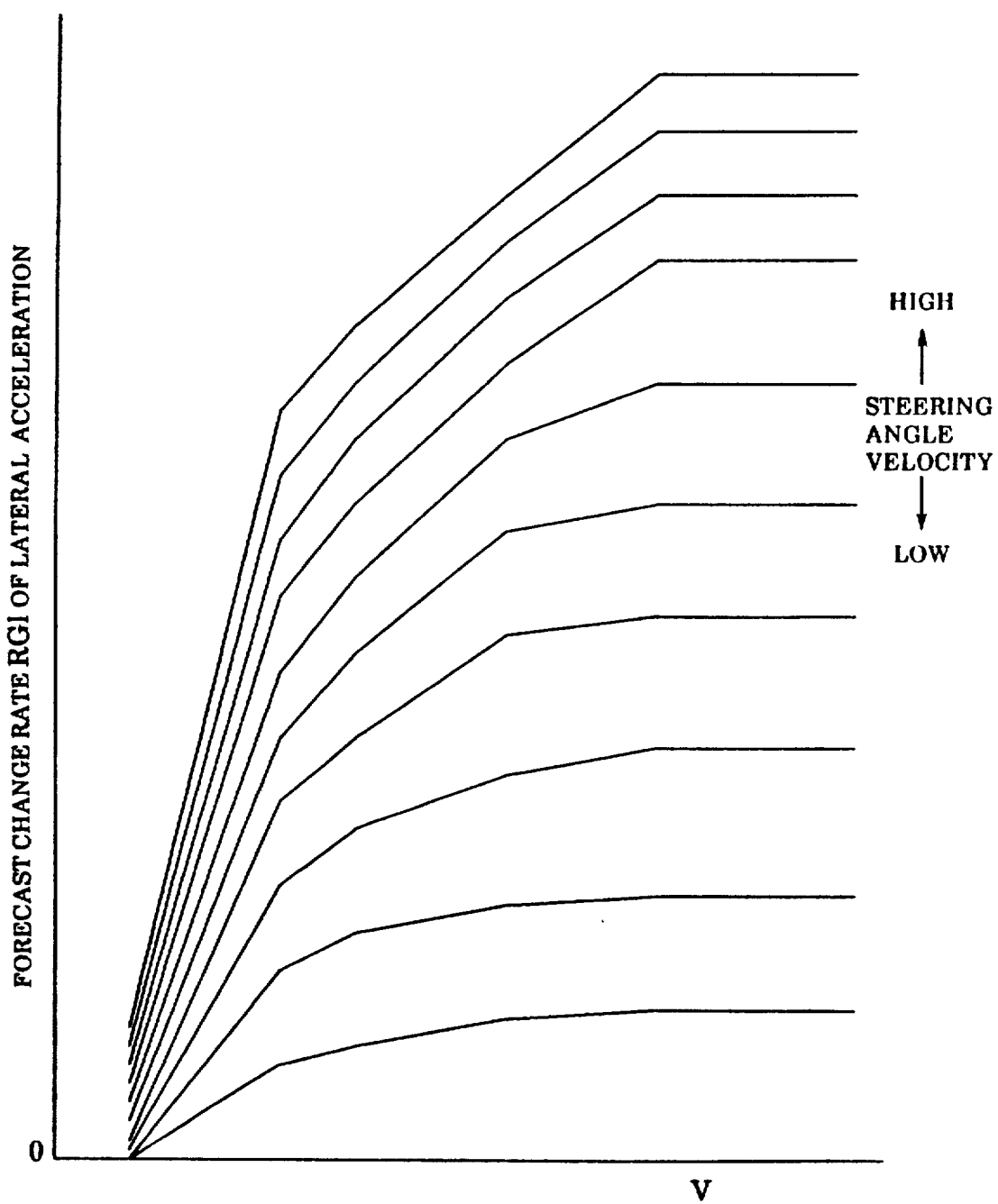
FIG. 12 is a graph showing a relation among the vehicle speed V, the steering angle velocity RAs and the forecast changing rate RGl of the lateral acceleration.

Then, based upon a map such as the graph of FIG. 12, the steering angle velocity RAs calculated above, and the vehicle speed V, a forecast change rate RGl of the lateral acceleration Gl is calculated, and then the flow of control proceeds to step 380:

In step 380, calculations for reversal conversion of the acceleration modes are carried out according to the following equations, and then the flow of control proceeds to step 390:

$$Pg1 = Kg1/4 \cdot (-Cgp - K2f \cdot Cgr + K1f \cdot RGl)$$

$$Pg2 = Kg2/4 \cdot (-Cgp - K2f \cdot Cgr - K1f \cdot RGl)$$

$$Pg3 = Kg3/4 \cdot (Cgp + K2r \cdot Cgr + K1r \cdot RGl)$$

$$Pg4 = Kg4/4 \cdot (Cgp - K2r \cdot Cgr - K1r \cdot RGl)$$

In the above equations, Kg1, Kg2, Kg3 and Kg4 are proportional constants, and K1f, K1r, K2f and K2r are constants for distributing gains between the front and rear vehicle wheels.

In step 390, based upon the pressures Pbi stored in the RAM 208 in step 150 and the results of calculations in steps 340 and 380, target pressures Pui for the pressure control means are calculated according to the following equation, and thereafter the flow of control proceeds to step 400:

$$Pui = Pxi + Pgi + Pbi \quad (i = 1, 2, 3 \text{ and } 4)$$

In step 400, target electric currents to be supplied to the pressure control means are calculated according to the following equations, and then the flow of control proceeds to step 410:

$$I1 = Ku1 \cdot Pu1 + Kh(Psr - Ps) - Kl \cdot Pd - a$$

$$I2 = Ku2 \cdot Pu2 + Kh(Psr - Ps) - Kl \cdot Pd - a$$

$$I3 = Ku3 \cdot Pu3 - Kh(Psr - Ps) - Kl \cdot Pd$$

$$I4 = Ku4 \cdot Pu4 + Kh(Psr - Ps) - Kl \cdot Pd$$

It is to be noted that Ku1, Ku2, Ku3, Ku4 are proportional constants for the corresponding vehicle wheels; Kh and Kl are compensation coefficients for the pressures in the high pressure and the low pressure lines, respectively; a is a compensation constant between the front and rear vehicle wheels; and Psr is a standard pressure in the high pressure line.

Figure 13:
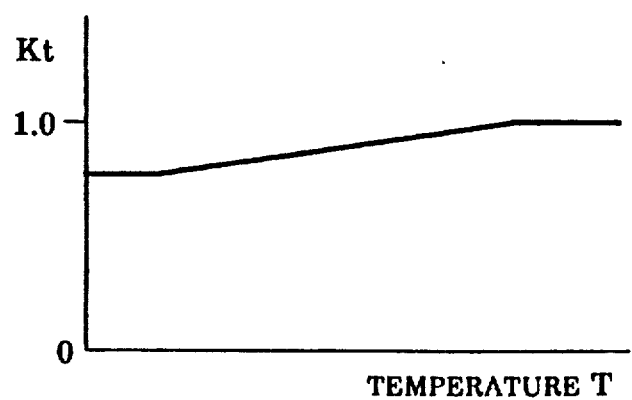
FIG. 13 is a graph showing a relation between the temperature T of oil and the compensation coefficient Kt.

In step 410, based upon the temperature T of oil read in in step 30 and the map of the graph shown in FIG. 13, a compensation coefficient Kt for the oil temperature is calculated, and the calculations for compensating the target electric currents with respect to the oil temperature are carried out according to the following equation, and then the flow of control proceeds to step 420:

$$Iti = Kt \cdot Ii \quad (i = 1, 2, 3 \text{ and } 4)$$

In step 420, an electric current for a warping, i.e., a twisting of the vehicle body about the longitudinal axis thereof, is calculated according to the following equation, and thereafter the flow of control proceeds to step 430:

$$Iw = (It1 - It2) - (It3 - It4)$$

In step 430, denoting the target electric current value for warping as Riw, a difference of the electric current for warping from the target value therefor is calculated according to the following equation, and then the flow of control proceeds to step 440:

$$Eiw = Riw - Iw$$

In the above equation the target electric current value for warping Riw may be zero.

In step 440, employing a proportional constant Kiwp a target control value of the electric current for warping is calculated according to the following equation, and then the flow of control proceeds to step 450:

$$Eiwp = Kiwp \cdot Eiw$$

In step 450, calculations for reversal conversion of the electric current for warping are carried out according to the following equations, and thereafter the flow of control proceeds to step 460:

$$Iw1 = Eiwp/4$$

$$Iw2 = -Eiwp/4$$

$$Iw3 = -Eiwp/4$$

$$Iw4 = Eiwp/4$$

In step 460, based upon the values obtained by the calculations conducted in steps 410 and 450, final target electric currents Iui to be supplied to the pressure control means are calculated according to the following equation, and then the flow of control proceeds to the step 170 shown in FIG. 3.

$$Iui = Iti + Iwi (i = 1, 2, 3 \text{ and } 4)$$

Thus, according to the above described first embodiment, in either setting of the steering mode to the normal mode or the sports mode, the vehicle height is correspondingly desirably controlled in accordance with the front to rear wheel steering angle ratio. In more detail, when the front to rear wheel steering angle ratio is in the opposite phase region with the rate of generation of the lateral acceleration due to steering being relatively low, the heave target value Rxh is set to be relatively high so that the vehicle height is set higher, still not allowing the vehicle body to roll so much during turning as to substantially damage the riding comfortableness, while when the front to rear wheel steering angle ratio is in the same phase region with the rate of generation of lateral acceleration due to steering being relatively high, the heave target value Rxh is set to be relatively low so that the vehicle height is set lower to lower the center of gravity of the vehicle body, thus effectively suppressing the rolling of the vehicle body.

Further, according to the above described embodiment, in either setting of the four wheel steering to the normal mode or the sports mode each particular variation pattern of the heave target value Rxh is set to correspond to the variation pattern of the front to rear wheel steering angle ratio relative to the vehicle speed according to the normal mode or the sports mode, and therefore the rolling of the vehicle body is more desirably controlled so as to be well adapted to the performance of the lateral acceleration due to steering affected by the difference between the same phase mode and the opposite phase mode of the front to rear wheel steering angle ratio.

Further, since according to the above described embodiment the patterns of the heave target value for such a difference between the same phase mode and the opposite phase mode of the front to rear wheel steering angle ratio are switched over in accordance with the switching over of the front to rear wheel steering angle ratio between the normal mode and the sports mode, the rolling of the vehicle body is more desirably controlled than is available with an active suspension having a single pattern for calculating the heave target value relative to the vehicle speed.

Figure 6A:
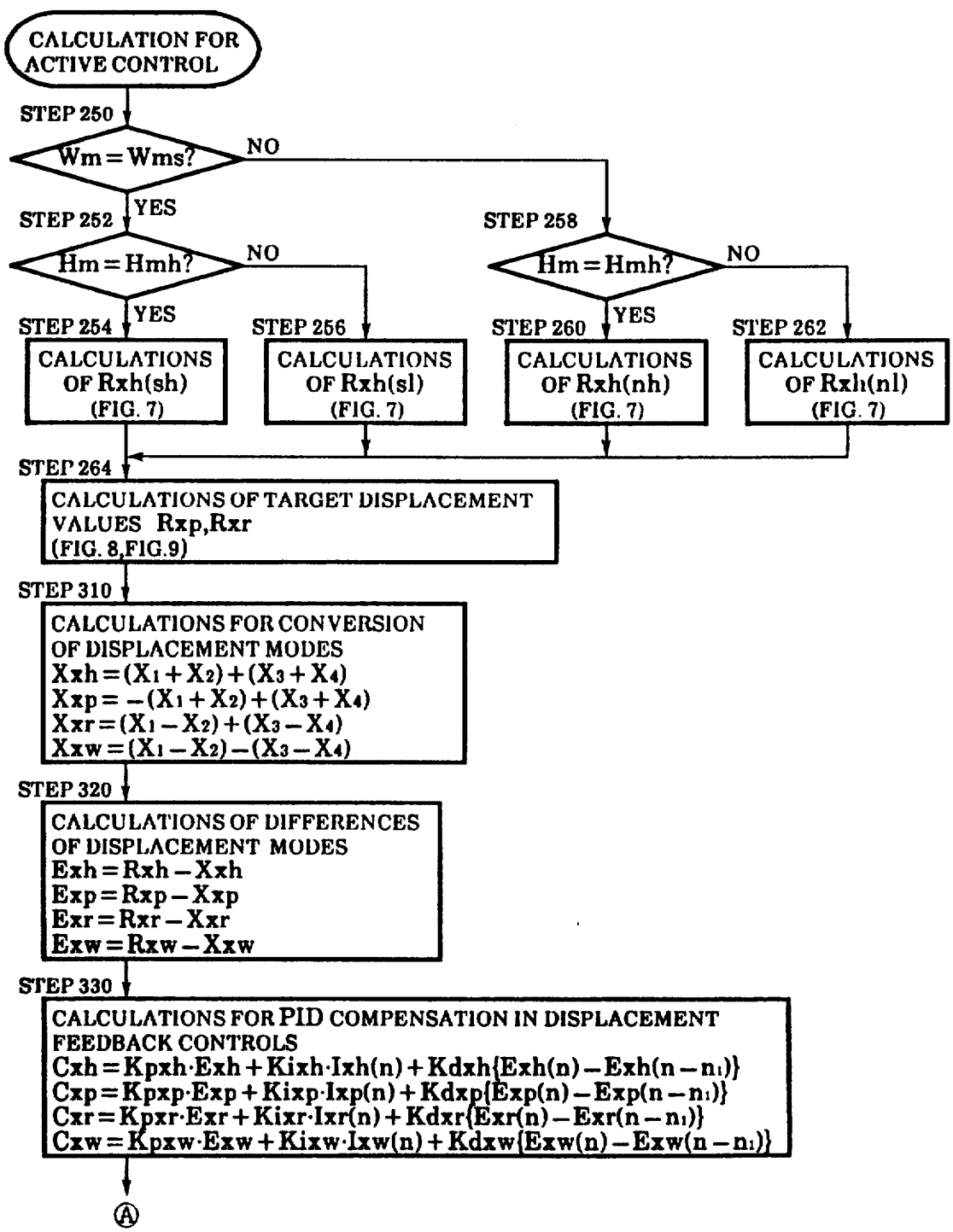
Figure 6C:
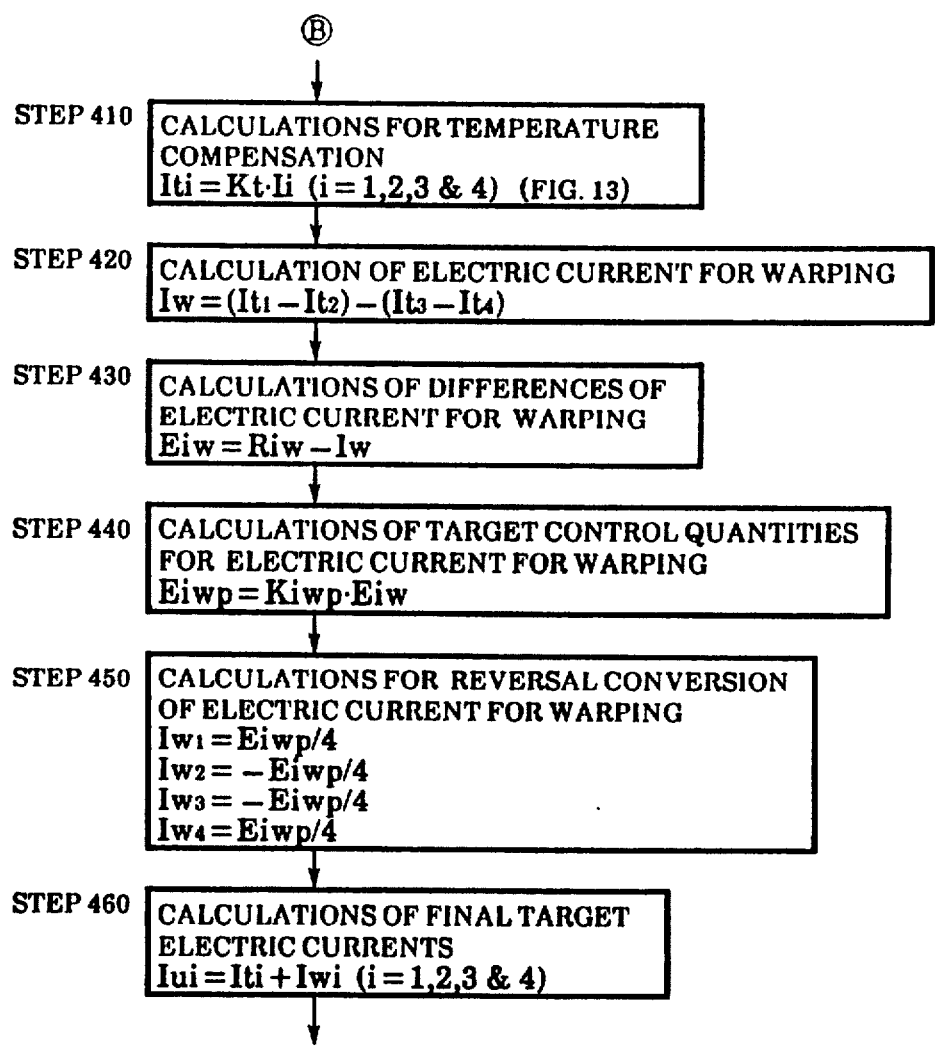
Figure 14A:
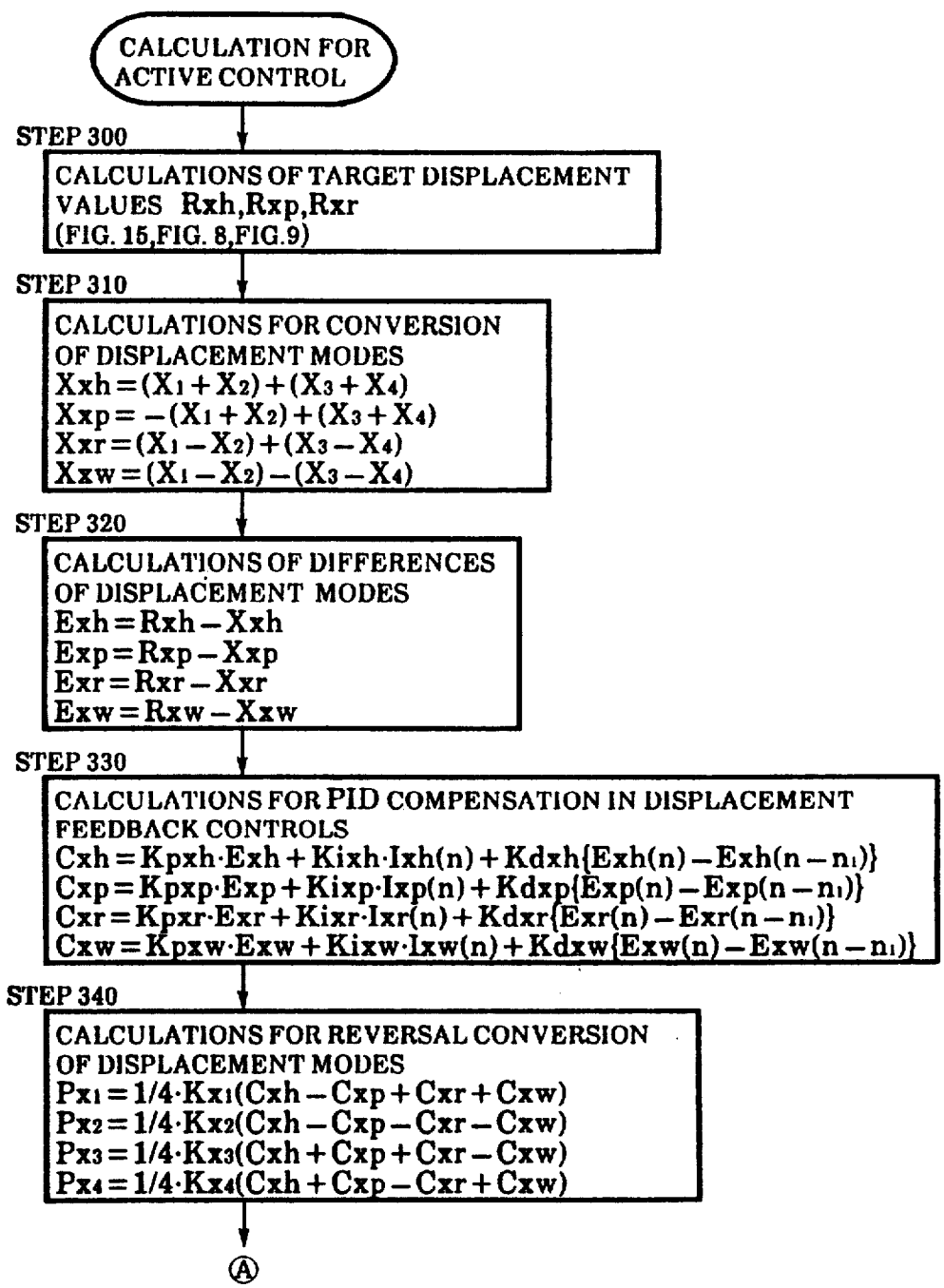
FIGS. 14A through 14C are flowcharts showing the active calculation routine according to the second embodiment of the present invention.
Figure 14B:
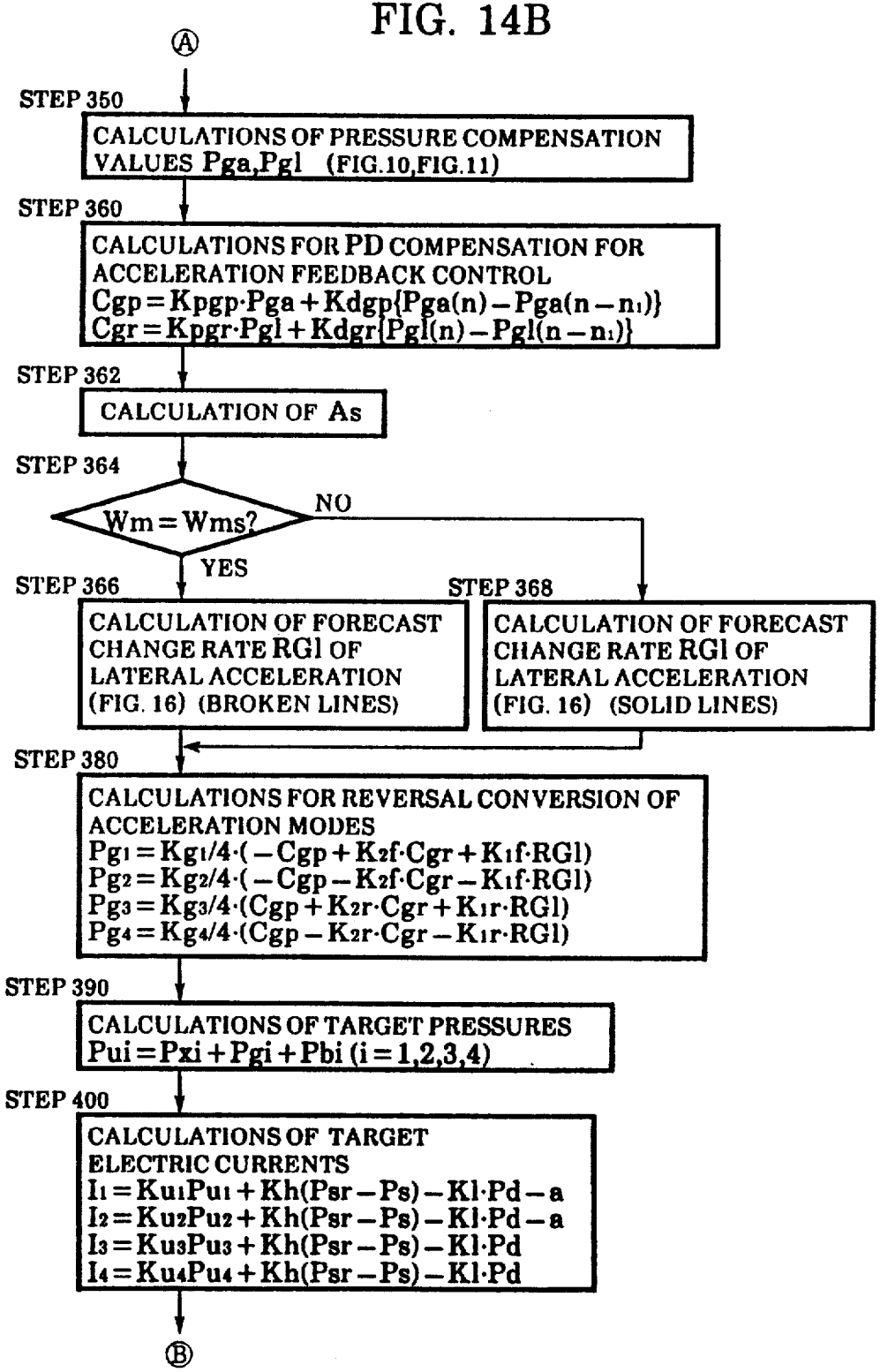
Figure 14C:
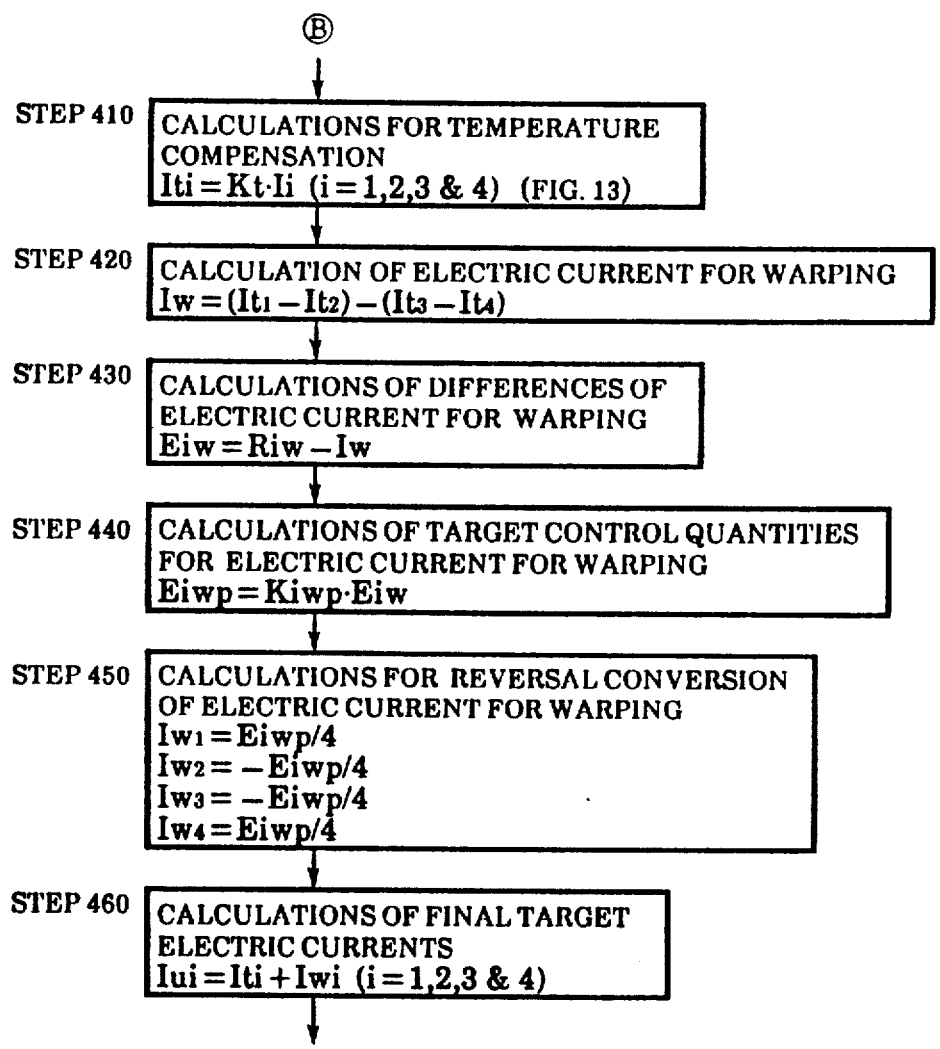

FIGS. 14A through 14C are flowcharts similar to FIGS. 6A through 6C, showing the calculation routines for the active suspension according to a second embodiment of the present invention. In FIGS. 14A through 14C the steps which are the same as those in FIGS. 6A through 6C are designated by the same step numbers as in FIGS. 6A through 6C, and repetitions of the same descriptions will omitted.

Figure 15:
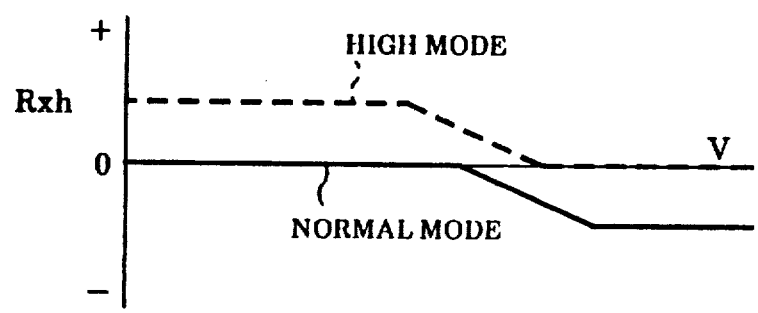
FIG. 15 is a graph showing a relation between the vehicle speed V and the target displacement Rxh.

In this second embodiment, in step 300 the heave target value Rxh, the pitch target value Rxp and the roll target value Rxr are calculated based upon the maps shown in FIGS. 15, 8 and 9, and the flow of control proceeds to step 310.

In this embodiment, subsequent to step 360 which is the same as that in FIG. 6B, in step 362, denoting As' as the steering angle read in in step 30 at the cycle preceding the current cycle by one cycle, the steering angle velocity RAs is calculated according to the following equation, and then the flow of control proceeds to step 364:

$$RAs = As - As'$$

In step 364, it is judged whether or not the four wheel steering mode Wm is the sports mode Wms, and when it is judged that Wm is not Wms, the flow of control proceeds to step 366, whereas when it is judged that Wm is Wms, the flow of control proceeds to step 366.

Figure 16:
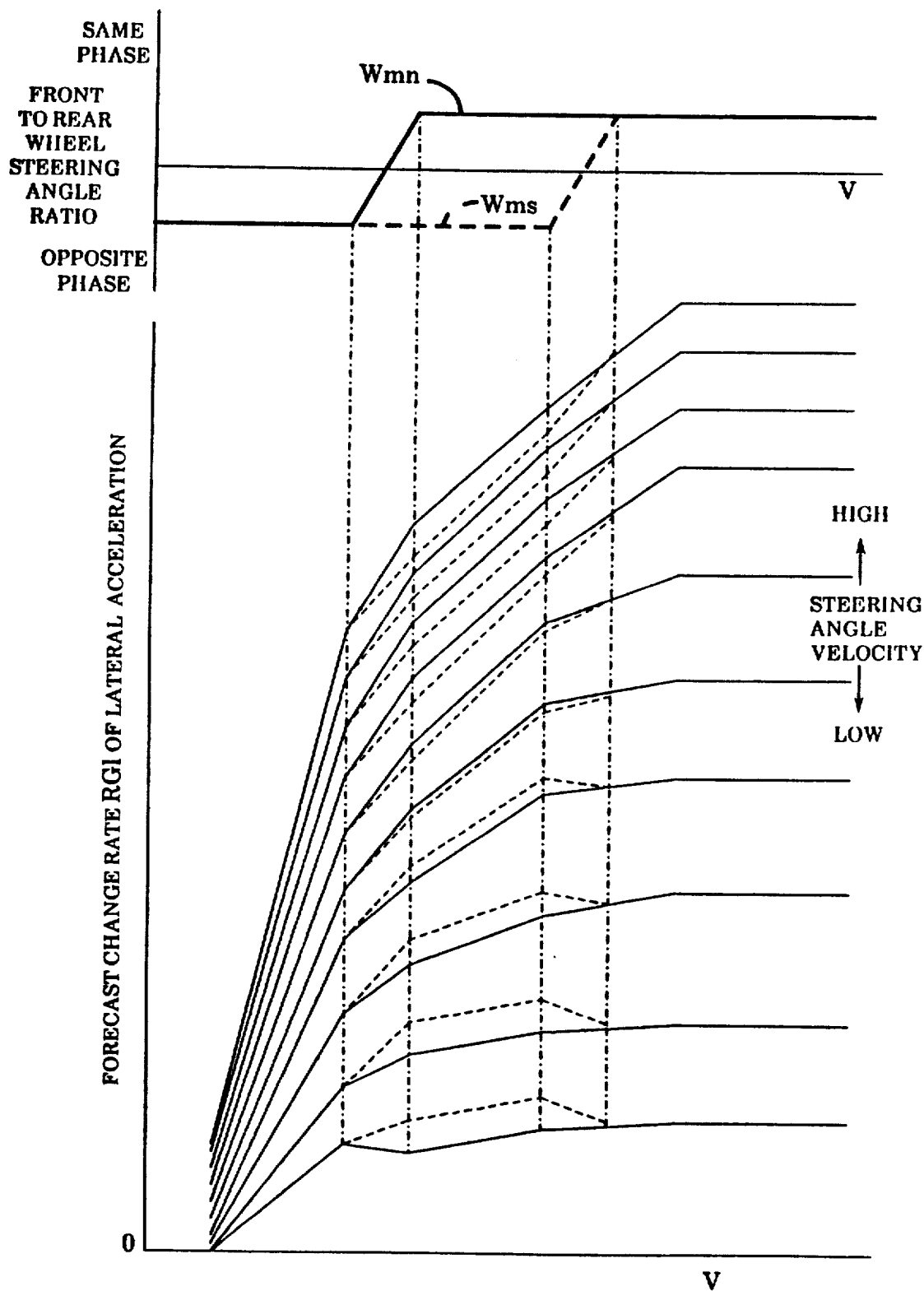
FIG. 16 is a graph showing a map for calculating the forecast changing rate of the lateral acceleration together with the performance curves of the four wheel steering means.

In step 366, the forecast change rate RGl of the lateral acceleration is calculated according to the broken lines in the map shown in the lower half portion of the graph of FIG. 16, and then the flow of control proceeds to step 380.

In step 368, the forecast change rate RGl of the lateral acceleration is calculated according to the solid lines in the map shown in the lower half portion of the graph of FIG. 16, and then the flow of control proceeds to step 380.

As shown in FIG. 16, the forecast change rate of the lateral acceleration RGl is increased when the front to rear wheel steering angle ratio is changed from the opposite phase to the same phase for the same vehicle speed. Further, the forecast change rate of the lateral acceleration RGl is less increased relative to the increase of the vehicle speed when the sports mode is selected than when the normal mode is selected.

Thus, according to this second embodiment, in either setting of the four wheel steering mode to the normal mode or the sports mode, the change rate RGl of the lateral acceleration is controlled in accordance with the front to rear wheel steering angle ratio. In other words, when the front to rear wheel steering angle ratio is in the opposite phase region, the forecast change rate of the lateral acceleration is set to be relatively low, so that the roll control during turning of the vehicle becoming excessive is avoided, whereas when the front to rear wheel steering angle ratio is in the same phase region, the forecast change rate of the lateral acceleration is set to be relatively high, so that the rolling of the vehicle body during turning of the vehicle is suppressed to a sufficient extent.

Further, in this second embodiment, since in either setting of the four wheel steering mode to the normal mode or the sports mode each particular pattern of the change rate of the lateral acceleration relative to the vehicle speed is set to correspond to the pattern of the change of the front to rear wheel steering angle ratio, the rolling of the vehicle body is more desirably suppressed in turning of the vehicle, so as not to cause over or under control thereof, than in an active suspension having no such respective patterns.

Further, according to this second embodiment, since such respective patterns of the change rate of the lateral acceleration are switched over in accordance with the switching over of the four wheel steering mode between the normal mode or the sports mode, i.e. the change of the variation pattern of the front to rear wheel steering angle ratio relative to the vehicle speed, the rolling of the vehicle body is more desirably controlled in accordance with the change over of the four wheel steering mode in turning of the vehicle than in an active suspension in which the change rate of the lateral acceleration is set by a single pattern regardless of the switching over of the four wheel steering mode.

Figure 17A:
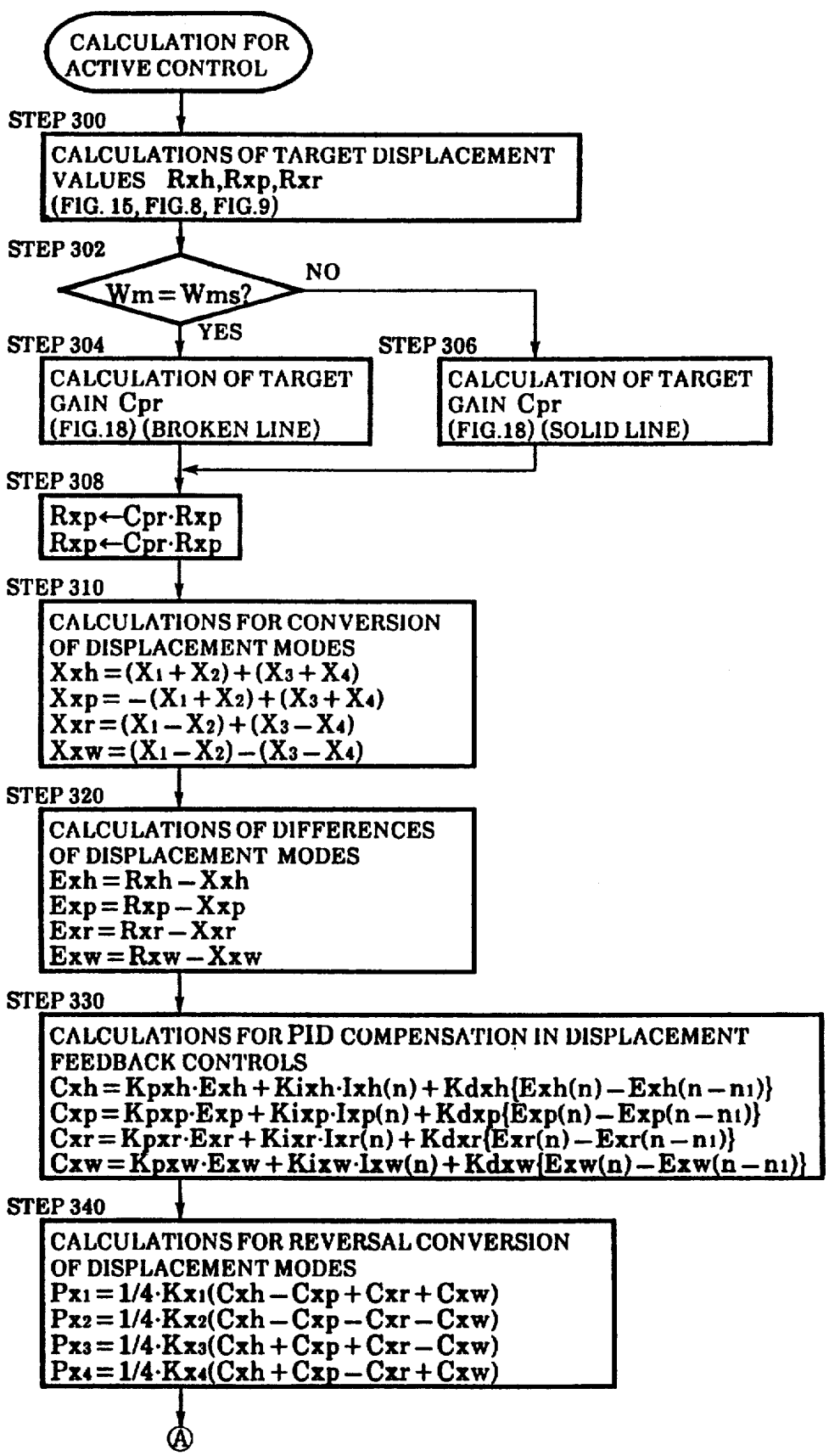
FIGS. 17A through 17C are flowcharts showing the active calculation routine according to the third embodiment of the present invention.
Figure 17B:
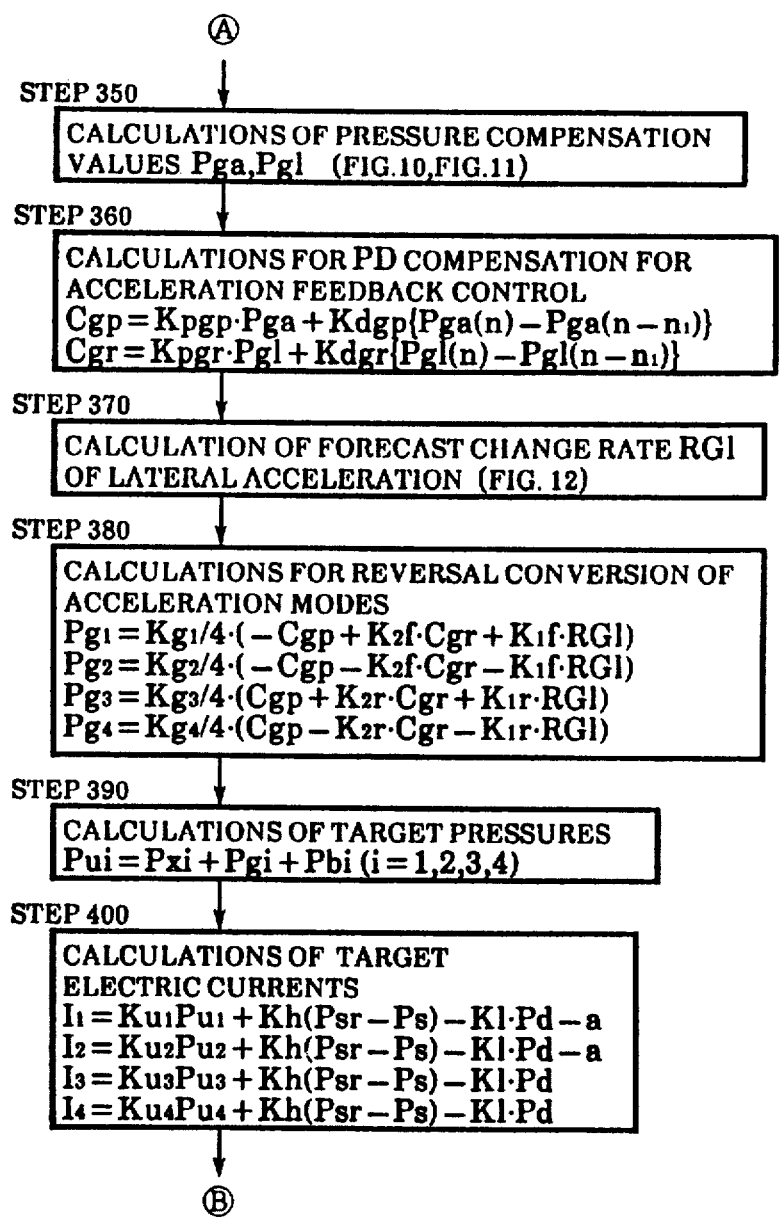
Figure 17C:
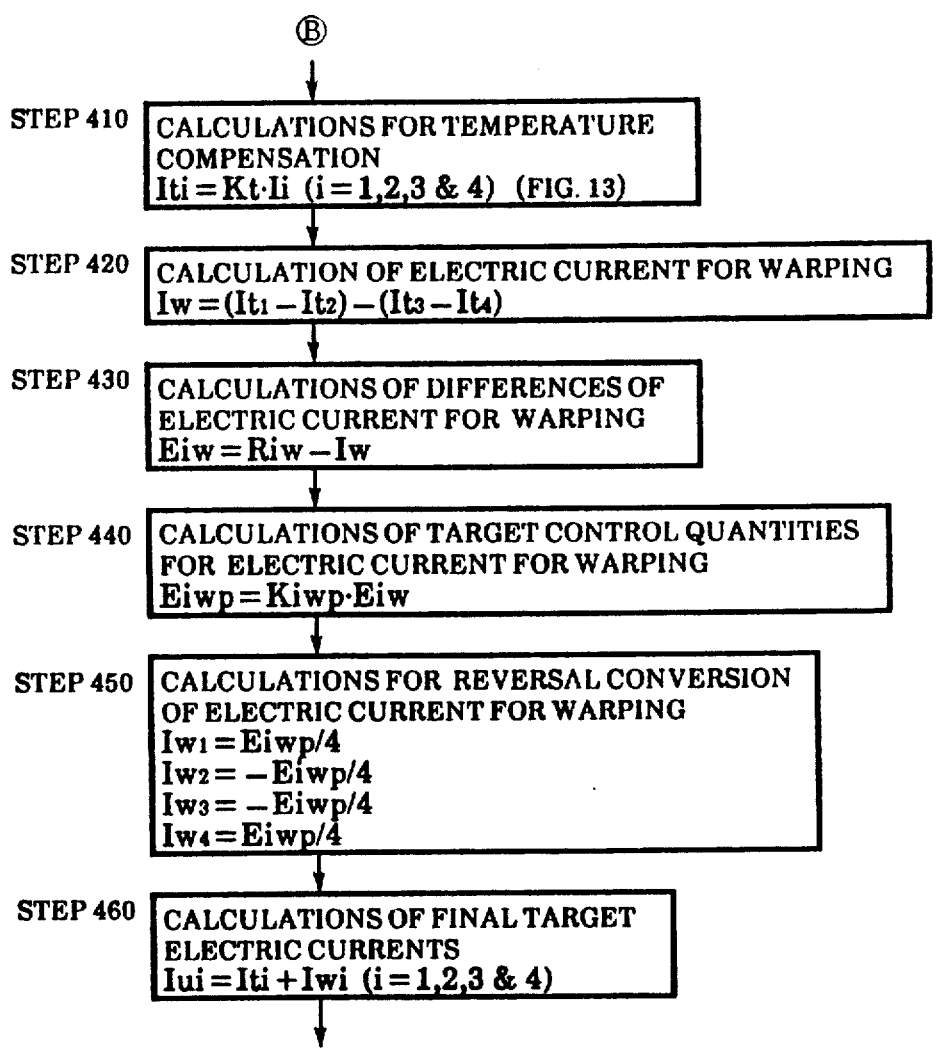

FIGS. 17A through 17C are flowcharts similar to FIGS. 6A through 6C, showing the active calculation routine according to a third embodiment of the present invention. In FIGS. 17A through 17C the steps which are the same as those in FIGS. 6A through 6C or FIGS. 14A through 14C are designated by the same step numbers and further repetition of descriptions will be omitted.

In this third embodiment, after step 300, in step 302 it is judged whether or not the four wheel steering mode Wm is the sports mode Wms. When it is judged that Wm is not Wms, the flow of control proceeds to step 306, whereas when it is judged that Wm is Wms, the flow of control proceeds to step 304.

Figure 18:
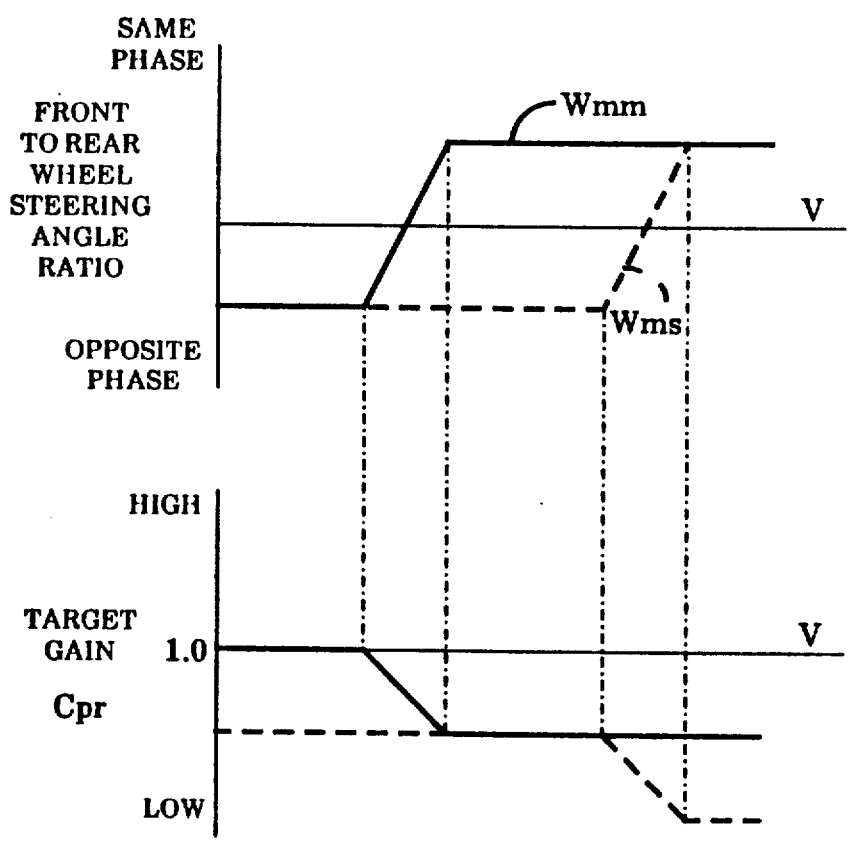
FIG. 18 is a graph showing a map for calculating the target gain Cpr together with the performance curves of the four wheel steering means.

In step 304, a target gain Cpr is calculated according to a map such as the broken line in the lower half portion of the graph of FIG. 18, and then the flow of control proceeds to step 308.

In step 306, the target gain Cpr is calculated according to a map such as the solid line in the lower half portion of the graph of FIG. 18, and then the flow of control proceeds to step 308.

In step 308, the pitch target value Rxp and the roll target value Rxr are calculated according to the following equations, respectively, and then the flow of control proceeds to step 310:

$$Rxp = Cpr \cdot Rxp$$

$$Rxr = Cpr \cdot Rxr$$

Thus, according to this third embodiment, in either setting of the four wheel steering mode to the normal mode or the sports mode the pitching and the rolling of the vehicle body is desirably controlled in accordance with the front to rear wheel steering angle ratio. In other words, when the front to rear wheel steering angle ratio is in the opposite phase region at low to medium vehicle speed, the pitch target value Rxp and the roll target value Rxr are generally set to be relatively high, and thereby it is avoided that the comfortability of the vehicle is damaged, while when the front to rear wheel steering angle ratio is in the same phase region at medium to high vehicle speed, the pitch target value and the roll target value are generally set to be relatively low, and thereby the pitching and the rolling of the vehicle body are effectively suppressed.

Further, according to this third embodiment, since in either setting of the front to rear wheel steering angle ratio to the normal mode or the sports mode such respective patterns of the target gain Cpr are set to correspond to the patterns of the change of the front to rear wheel steering angle ratio relative to the vehicle speed, the pitching and the rolling of the vehicle body are more effectively suppressed without sacrificing the riding comfortableness of the vehicle than in an active suspension having no such respective particular patterns.

Further, according to this third embodiment, since such respective patterns of the target gain Cpr are switched over according to whether the four wheel steering mode is set to the normal mode or the sports mode, i.e. in accordance with switching over of the patterns of the change of the front to rear wheel steering angle ratio relative to the vehicle speed, the pitching and the rolling of the vehicle body are more desirably controlled according to the change of the four wheel steering mode than in an active suspension in which the target gain is set according to a single pattern.

Figure 19A:
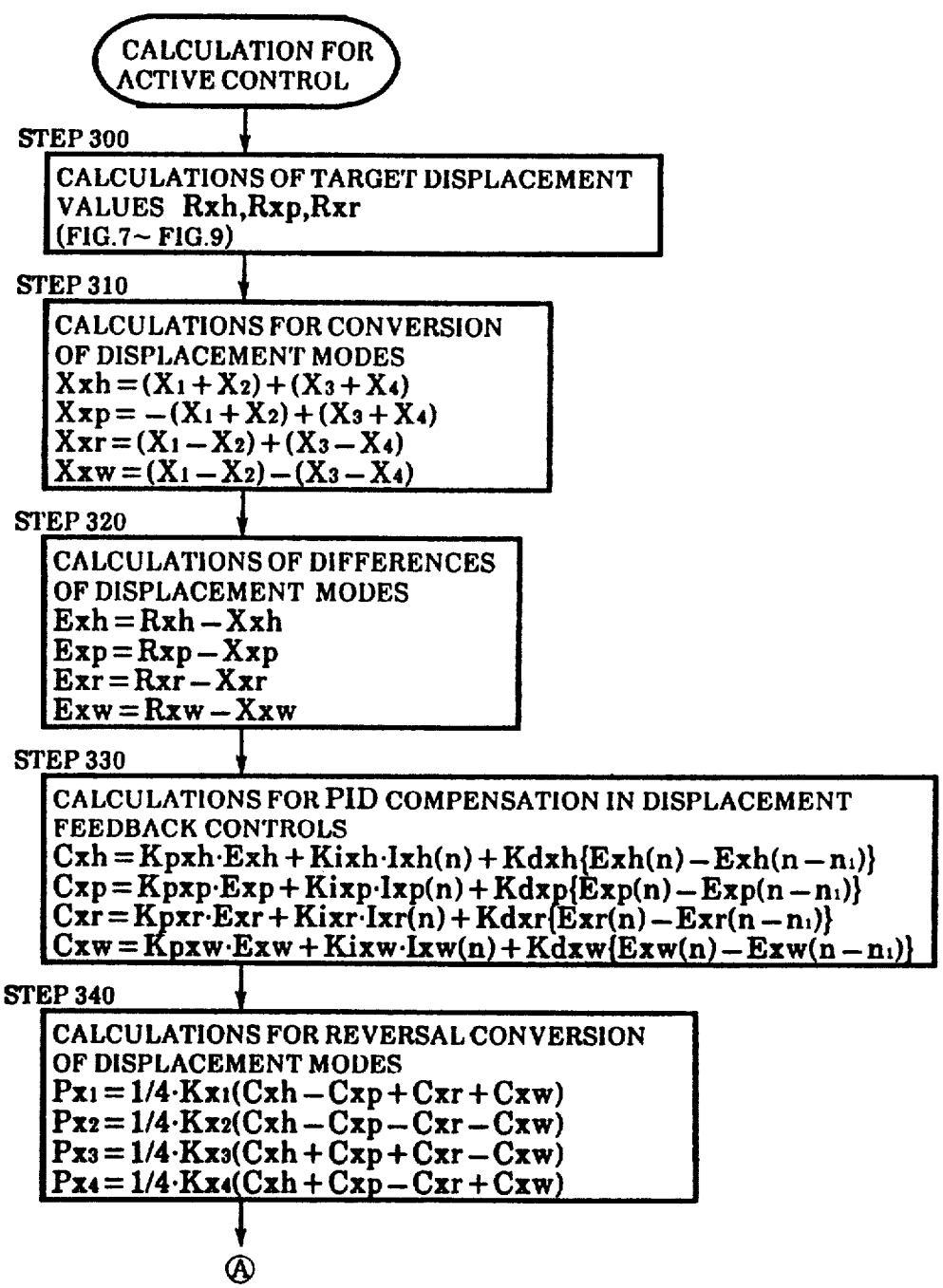
FIGS. 19A through 19C are flowcharts showing the active calculation routine according to the fourth embodiment of the present invention.
Figure 19B:
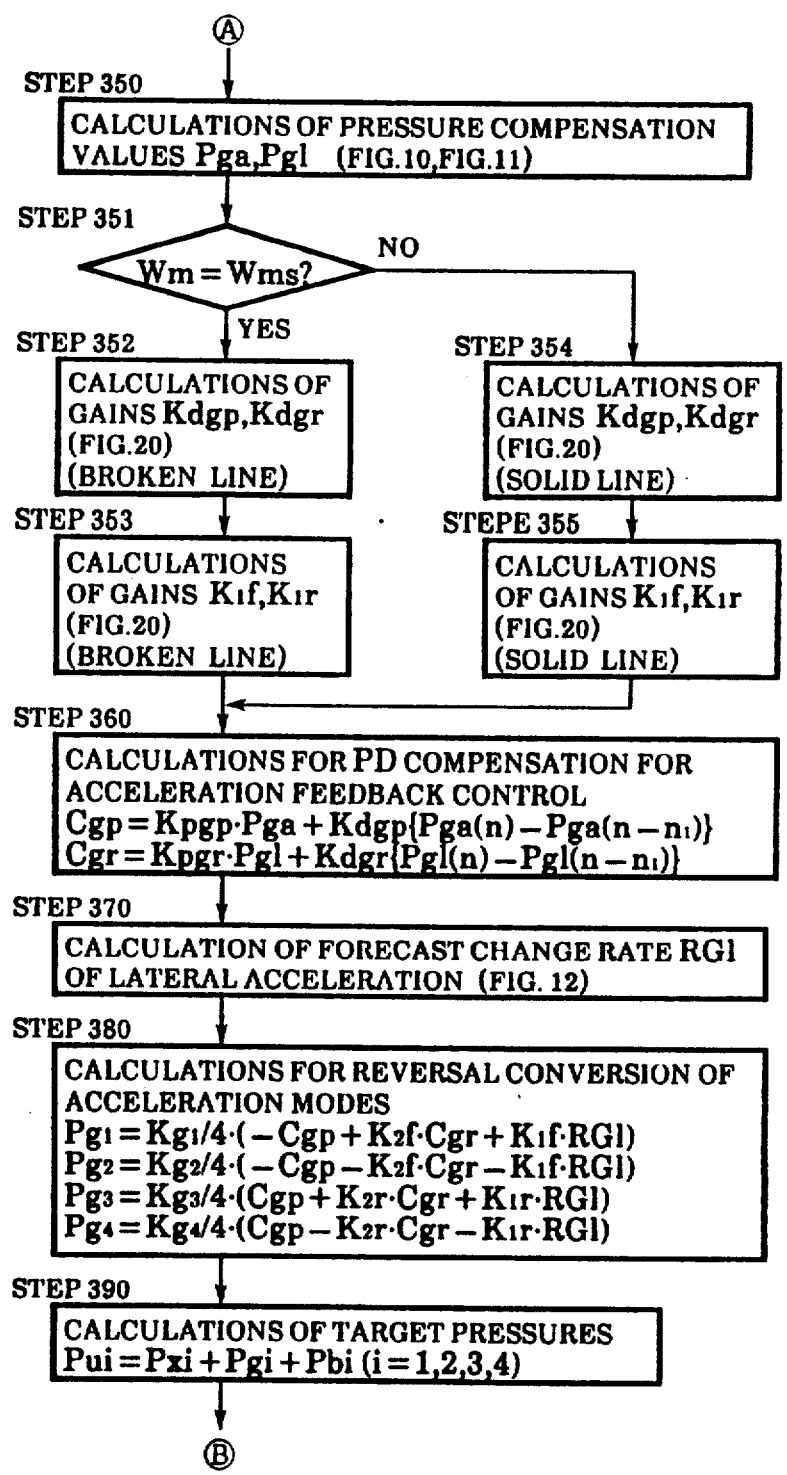
Figure 19C:
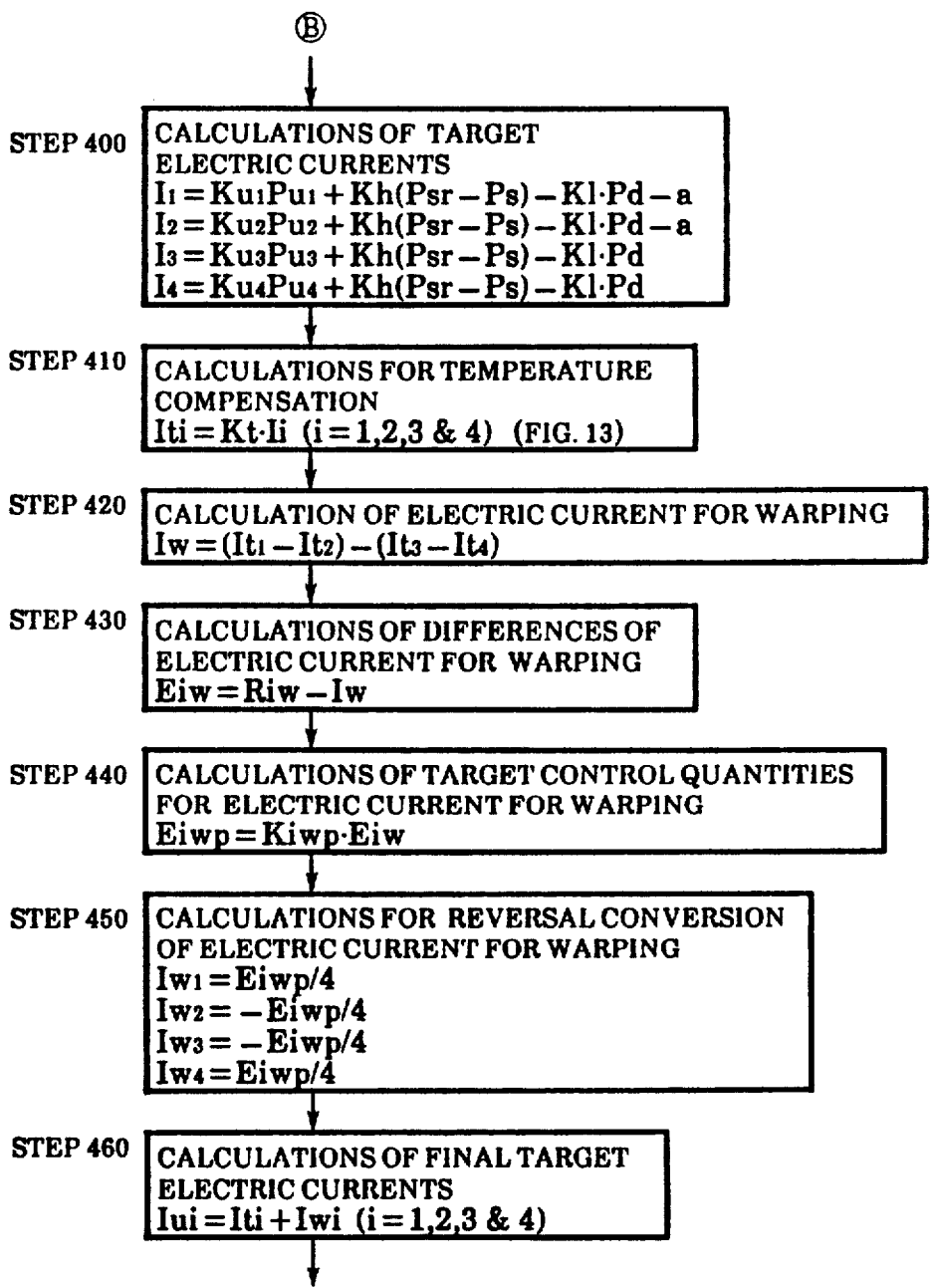

FIGS. 19A through 19C are flowcharts similar to FIGS. 6A through 6C, showing the active calculation routine according to a fourth embodiment of the present invention. In FIGS. 19A through 19C the steps which are the same as those in FIGS. 6A through 6C or FIGS. 14A through 14C are designated by the same step numbers and further repetition of descriptions will be omitted.

In this fourth embodiment, subsequent to step 350, in step 351 it is judged whether or not the four wheel steering mode Wm is set to the sports mode Wms, and when it is judged that Wm is not Wms, the flow of control proceeds to step 354, whereas when it is judged that Wm is Wms, the flow of control proceeds to step 352.

Figure 20:
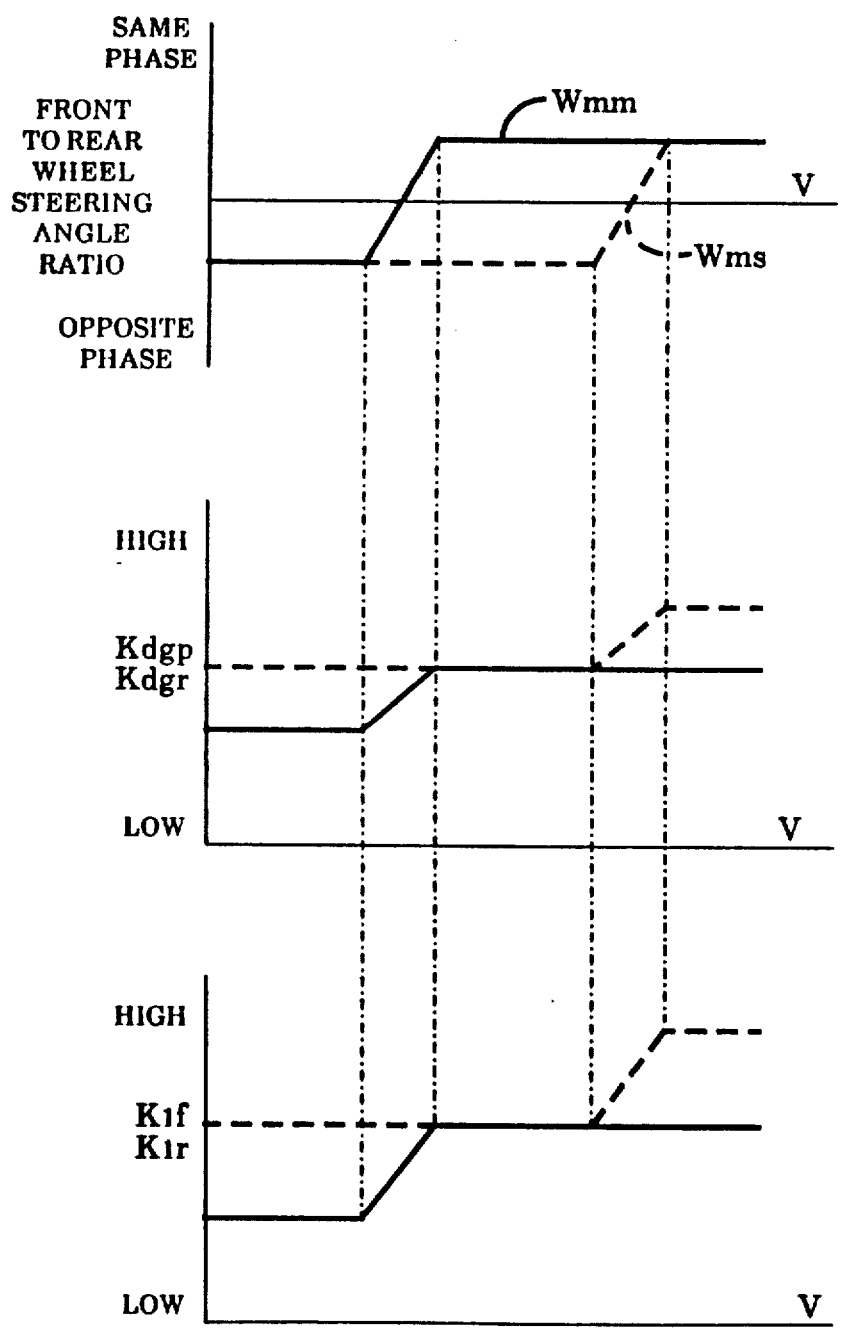
FIG. 20 are graphs showing maps for calculating the gains Kdgp, Kdgr, K1f and K1r together with the performance curves of the four wheel steering means.
Figure 1:
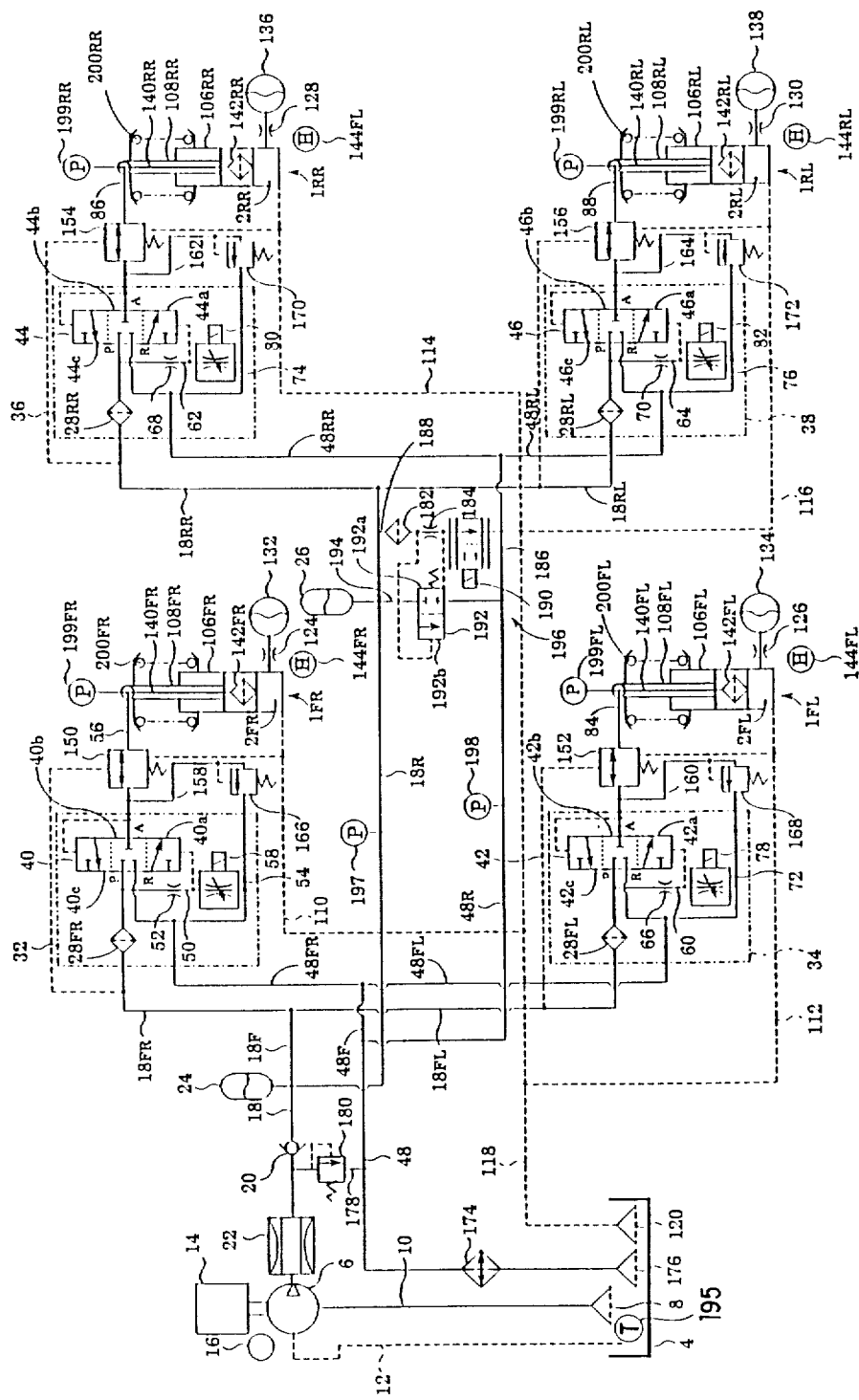
Figure 17A:
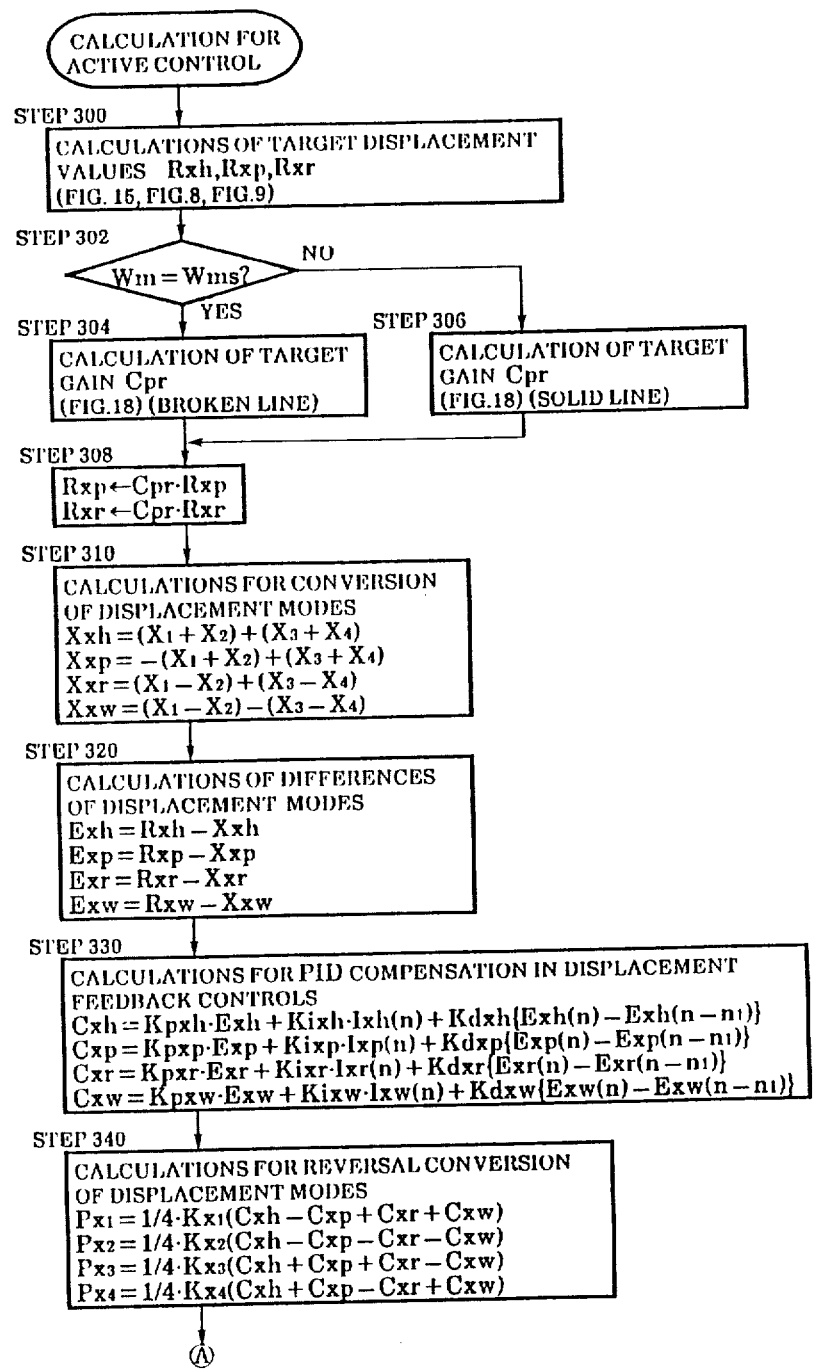

In step 352, gains Kdgp and Kdgr used in the calculations in step 360 are calculated according to a map such as the broken line of the middle portion of the graph of FIG. 20, and then the flow of control proceeds to step 353.

In the embodiment shown in FIG. 20, the gains Kdgp and Kdgr are a relatively low constant value in a region of low vehicle speed and are increased to a medium constant value in a region of medium to high vehicle speed corresponding to the change of the front to rear wheel steering angle ratio from the opposite phase to the same phase when the normal mode is selected, while they are a medium constant value in a region of low to medium vehicle speed and are increased to a relatively high value in a region of high vehicle speed corresponding to the change of the front to rear wheel steering angle ratio from the opposite phase to the same phase when the sports mode is selected.

In step 353, gains K1f and K1r used in the calculations in step 380 are calculated according to a map such as the broken line of the lower portion of the graph of FIG. 20, and then the flow of control proceeds to step 360.

In the embodiment show in FIG. 20, the gains K1f and K1r are also a relatively low constant value in a region of low vehicle speed and are increased to a medium constant value in a region of medium to high vehicle speed corresponding to the change of the front to rear wheel steering angle ratio from the opposite phase to the same phase when the normal mode is selected, while they are a medium constant value in a region of low to medium vehicle speed and are increased to a relatively high value in a region of high vehicle speed corresponding to the change of the front to rear wheel steering angle ratio from the opposite phase to the same phase when the sports mode is selected.

In step 354, the gains Kdgp and Kdgr are calculated according to a map such as the solid line of the middle portion of the graph of FIG. 20, and then the flow of control proceeds to step 355.

In step 355, the gains K1f and K1r are calculated according to a map such as the solid line of the lower portion of the graph of FIG. 20, and then the flow of control proceeds to step 360.

Thus, according to this fourth embodiment, in either setting of the four wheel steering mode to the normal mode or the sports mode the control amounts based upon the longitudinal and the lateral acceleration of the vehicle body and the forecast rate of change of the lateral acceleration are desirably controlled in accordance with the front to rear wheel steering angle ratio. In other words, when the front to rear wheel steering angle ratio is in the opposite phase region, the gains Kdgp and Kdgr or K1f and K1r are generally set to be relatively low, and thereby it is avoided that the roll control for the vehicle body becomes excessive, while when the front to rear wheel steering angle ratio is in the same phase region, those gains are generally set to be relatively high, and thereby the pitching and the rolling of the vehicle body are desirably suppressed.

Further, in this fourth embodiment, since in either setting of the four wheel steering mode to the normal mode or the sports mode the respective patterns are set for the gains relative to the vehicle speed according to the respective patterns of change of the front to rear wheel steering angle ratio, the pitching and the rolling of the vehicle body are desirably controlled so as not to be overcontrolled than in an active suspension having no such respective patterns.

Further, in this fourth embodiment, since the patterns of the respective gains relative to the vehicle speed are switched over according to whether the four wheel steering mode is set to the normal mode or the sports mode, the pitching and the rolling of the vehicle body are more desirably controlled than in an active suspension in which a single pattern is set for each gain.

In the above four embodiments the four wheel steering means are constructed to be responsive to the vehicle speed. However, for example, in the maps of FIGS. 18 and 20 the abscissa may be changed to the steering angle so that the present invention is applied to a vehicle having a four wheel steering means responsive to the steering angle.

Although the invention has been described in the above with respect the particular embodiments thereof, it will be apparent to one ordinary skill in the art that various modifications are possible within the scope of the present invention.

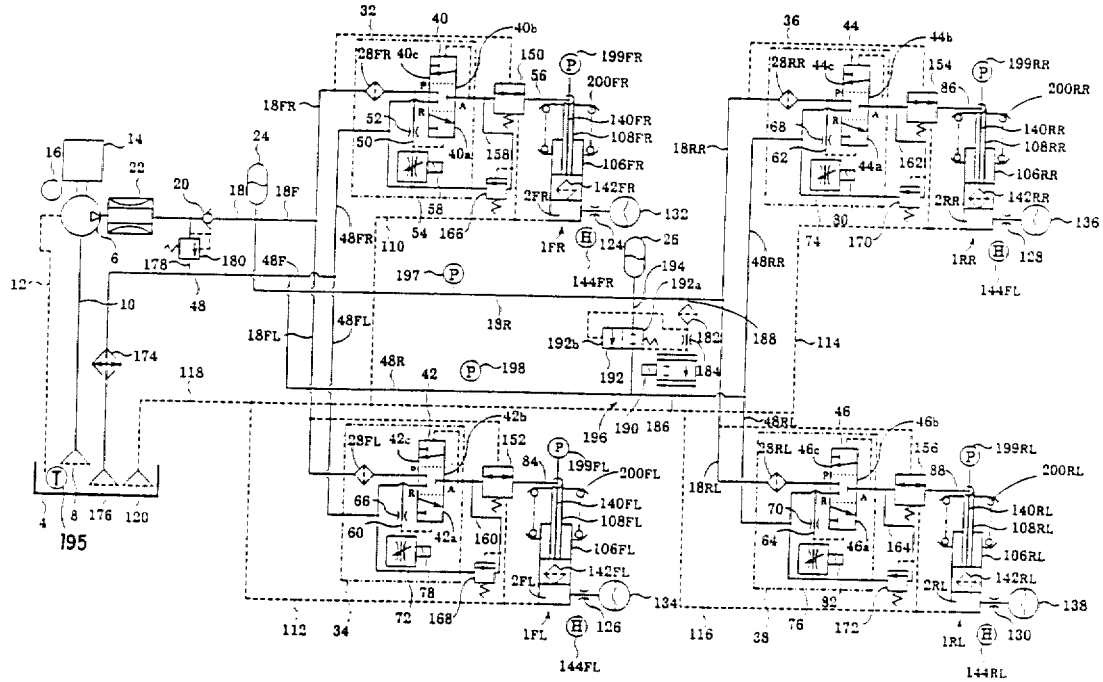

We claim:

1. A fluid pressure type active suspension in a vehicle such as an automobile having a four wheel steering means, comprising fluid pressure type actuators each provided between a vehicle body and each wheel, working fluid supply and exhaust means for supplying and exhausting a working fluid to and from each said actuator, vehicle height detection means for detecting vehicle height of a portion of the vehicle body corresponding to each said wheel relative to said wheel, and a control means for controlling said working fluid supply and exhaust means according to control parameters including a vehicle height detected by said vehicle height detection means, wherein said control means is adapted to modify the control of said working fluid supply and exhaust means in accordance with whether a front to rear wheel steering angle ratio of said four wheel steering means is in a same phase region or an opposite phase region.

2. A fluid pressure type active suspension according to claim 1, wherein said control means controls said working fluid supply and exhaust means so as to adjust the vehicle height detected by said vehicle height detection means to a target value therefor, said target value being set in said control means to be lower when said front to rear wheel steering angle ratio is in said same phase region than when said front to rear wheel steering angle ratio is in said opposite phase region.

3. A fluid pressure type active suspension according to claim 1, wherein said control means controls said working fluid supply and exhaust means so as to suppress rolling of the vehicle body due to turning of the vehicle, said control means suppressing said rolling of the vehicle body more when said front to rear wheel steering angle ratio is in said same phase region than when said front to rear wheel steering angle ratio is in said opposite phase region.

4. A fluid pressure type active suspension according of claim 3, wherein said control means controls said working fluid supply and exhaust means so as to suppress said rolling of the vehicle body due to turning of the vehicle based upon forecasting a change rate of a lateral acceleration generated in the vehicle body due to turning of the vehicle, said change rate of the lateral acceleration being forecast to be higher when said front to rear wheel steering angle ratio is in said same phase region than when said front to rear wheel steering angle ratio is in said opposite phase region.

5. A fluid pressure type active suspension according of claim 1, wherein said four wheel steering means is adapted to provide said front to rear wheel steering angle ratio in a variable manner in accordance with a selection of mode between a normal mode and a sports mode, said four wheel steering means providing said front to rear wheel steering angle ratio in said opposite phase at vehicle speed lower than a first vehicle speed and in said same phase at vehicle speed higher than said first vehicle speed according to said normal mode, while said four wheel steering means providing said front to rear wheel steering angle ratio in said opposite phase at vehicle speed lower than a second vehicle speed higher than said first vehicle speed and in said same phase at vehicle speed higher than said second vehicle speed according to said sports mode.

* * * * *

UNITED STATES PATENT AND TRADEMARK OFFICE
CERTIFICATE OF CORRECTION

PATENT NO. : 5,069,475

DATED : December 3, 1991

INVENTOR(S) : Takashi Yonekwawa, et al.

It is certified that error appears in the above-identified patent and that said Letters Patent is hereby corrected as shown below:

The title page showing the illustrative figure should be deleted to be replaced with the attached title page.

The sheets of drawings consisting of Figs. 1 and 17A should be deleted to be replaced with the attached figures 1 and 17A.

Signed and Sealed this

Twenty-fifth Day of May, 1993

Attest:

MICHAEL K. KIRK

Attesting Officer

Acting Commissioner of Patents and Trademarks

United States Patent [19]
Yonekawa et al.

[11] Patent Number: 5,069,475
[45] Date of Patent: Dec. 3, 1991

[54] FLUID PRESSURE TYPE ACTIVE SUSPENSION HAVING VARIABLE PERFORMANCE RESPONSIVE TO FRONT TO REAR WHEEL STEERING ANGLE RATIO

[75] Inventors: Takashi Yonekawa, Mishima; Shuuichi Buma; Toshio Aburaya, both of Toyota; Kunihito Sato, Susono; Masaki Kawanishi, Toyota; Toshiaki Hamada, Toyota; Shinichi Tagawa, Toyota, all of Japan

[73] Assignees: Toyota Jidosha Kabushiki Kaisha; Aisin Seiki Kabushiki Kaisha, both of Aichi, Japan

[21] Appl. No.: 575,553

[22] Filed: Aug. 30, 1990

[30] Foreign Application Priority Data

Sep. 5, 1989 [JP] Japan ............... 1-230244

[51] Int. Cl.⁵ .......................................... B60G 11/26
[52] U.S. Cl. .......................... 280/707; 280/91; 180/142
[58] Field of Search ............ 280/91, 707, 714; 180/142; 346/424.05

[56] References Cited

U.S. PATENT DOCUMENTS

| | | | |
|---|---|---|---|
| 4,717,173 | 1/1988 | Sugasawa et al. | 280/707 |
| 4,789,935 | 12/1988 | Buma et al. | 364/424.05 |
| 4,853,860 | 8/1989 | Achenbach | 364/424.05 |
| 4,973,080 | 11/1990 | Ikemoto et al. | 280/707 |
| 4,979,115 | 12/1990 | Takahashi | 364/424.05 |
| 4,999,777 | 12/1991 | Schussler et al. | 364/424.05 |

FOREIGN PATENT DOCUMENTS

| | | |
|---|---|---|
| 0114757 | 8/1984 | European Pat. Off. |
| 3408292A1 | 8/1985 | Fed. Rep. of Germany |
| 55-91458 | 7/1980 | Japan |
| 60-135368 | 7/1985 | Japan |
| 61-218414 | 9/1986 | Japan |
| 62-198509 | 9/1987 | Japan |
| 63-106133 | 5/1988 | Japan |
| 63-106127 | 6/1988 | Japan |
| 63-279915 | 11/1988 | Japan |
| 1-197109 | 8/1989 | Japan |
| 2-38122 | 2/1990 | Japan |
| 63 307190 | 6/1990 | Japan |
| 63 607189 | 6/1990 | Japan |

Primary Examiner—Kenneth R. Rice
Attorney, Agent, or Firm—Oliff & Berridge

[57] ABSTRACT

A fluid pressure type active suspension in a vehicle such as an automobile having a four wheel steering means, including a fluid pressure type actuator provided between the vehicle body and each wheel, working fluid supply and exhaust means for supplying and exhausting a working fluid to and from each actuator, vehicle height detection means for detecting vehicle height of a portion of the vehicle body corresponding to each wheel relative to the wheel, and a control means for controlling the working fluid supply and exhaust means according to control parameters including a vehicle height detected by the vehicle height detection means, wherein the control means is adapted to modify the control of the working fluid supply and exhaust means in accordance with whether a front to rear wheel steering angle ratio of the four wheel steering means is in a same phase region or an opposite phase region so that the vehicle height is controlled to be higher or lower or the rolling control is suppressed less or more according to whether the front to rear wheel steering angle ratio is in the opposite phase region or in the same phase region, respectively.

5 Claims, 23 Drawing Sheets